United States Patent
Nassar et al.

(10) Patent No.: US 12,137,030 B2
(45) Date of Patent: Nov. 5, 2024

(54) DEEP REINFORCEMENT LEARNING FOR ADAPTIVE NETWORK SLICING IN 5G FOR INTELLIGENT VEHICULAR SYSTEMS AND SMART CITIES

(71) Applicant: University of South Florida, Tampa, FL (US)

(72) Inventors: Almuthanna Nassar, Tampa, FL (US); Yasin Yilmaz, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 18/479,227

(22) Filed: Oct. 2, 2023

(65) Prior Publication Data
US 2024/0039788 A1 Feb. 1, 2024

Related U.S. Application Data

(63) Continuation of application No. PCT/US2022/020788, filed on Mar. 17, 2022.
(Continued)

(51) Int. Cl.
*H04L 41/083* (2022.01)
*H04L 41/08* (2022.01)
(Continued)

(52) U.S. Cl.
CPC ............ *H04L 41/083* (2013.01); *H04L 41/16* (2013.01); *H04L 41/0886* (2013.01); *H04W 4/40* (2018.02); *H04W 28/0268* (2013.01)

(58) Field of Classification Search
CPC ... H04L 41/083; H04L 41/16; H04L 41/0886; H04L 47/83; H04L 41/0894; H04W 4/40; H04W 28/0268
See application file for complete search history.

(56) References Cited

U.S. PATENT DOCUMENTS

2019/0245806 A1\* 8/2019 Hanes .................. H04L 47/781
2019/0394812 A1 12/2019 Kuo et al.
(Continued)

FOREIGN PATENT DOCUMENTS

WO WO-2020245835 A1 \* 12/2020 ............. H04L 67/04

OTHER PUBLICATIONS

Baek et al. Managing Fog Networks using Reinforcement Learning Based Load Balancing Algorithm, Apr. 2019, IEEE Wireless Communications and Networking Conference, p. 1-7 (Year: 2019).\*
(Continued)

*Primary Examiner* — Schquita D Goodwin
*Assistant Examiner* — Joseph M Cousins
(74) *Attorney, Agent, or Firm* — Nicholas Pfeifer; Smith & Hopen, P. A.

(57) ABSTRACT

Systems and methods for processing a service request within a network environment can include a first cluster of fog nodes that execute service tasks. The cluster can include a primary fog node and nearest neighbor fog nodes. The primary fog node can receive, from the network, a service request, determine service request resource data that includes a first time, quantity of resource blocks required to serve the request, and a hold time required to serve the request locally. An edge controller, connected to the network and the first cluster, can receive, from the primary fog node, the service request resource data, identify available resources at the nearest neighbor fog nodes and the primary fog node, and determine whether resource blocks are available to fulfill the service request using deep reinforcement learning algorithms. The edge controller can also refer a rejected service request to a cloud computing system for execution.

17 Claims, 15 Drawing Sheets

Related U.S. Application Data

(60) Provisional application No. 63/169,501, filed on Apr. 1, 2021.

(51) Int. Cl.
| | | |
|---|---|---|
| *H04L 41/16* | (2022.01) | |
| *H04W 4/40* | (2018.01) | |
| *H04W 28/02* | (2009.01) | |

(56) References Cited

U.S. PATENT DOCUMENTS

2020/0195495 A1    6/2020  Parker et al.
2020/0293942 A1*   9/2020  Barton .................. G06F 9/5005

OTHER PUBLICATIONS

Shi et al., How to Attack and Defend 5G Radio Access Network Slicing with Reinforcement Learning, 2021, pp. 1-9.
Shi et al., Adversarial Machine Learning for Flooding Attacks on 5G Radio Access Network Slicing, 2021, pp. 1-6.
Hlope et al., AI Meets CRNs: A Prospective Review on the Application of Deep Architectures in Spectrum Management, Digital Object Identifier, 2021, pp. 11-43.
Zhao et al., Algorithm of task offloading and resource allocation based on reinforcement learning in edge computing, 2021 IEEE 5th Information Technology, Networking, Electronic and Automation Control Conference, 2021, pp. 1-4.
Liu et al., CLARA: A Constrained Reinforcement Learning Based Resource Allocation Framework for Network Slicing, 2021 IEEE International Conference on Big Data, pp. 1-11.
Gong et al., Deep Reinforcement Learning for Edge Computing Resource Allocation in Blockchain Network Slicing Broker Framework, 2021 IEEE 93rd Vehicular Technology Conference, 2021, pp. 1-6.
Bai et al., Deep Reinforcement Learning for Joint Offloading and Resource Allocation in Fog Computing, 2021 IEEE 12th International Conference on Software Engineering and Service Science, pp. 1-4.
Che et al., Deep Reinforcement Learning in M2M Communication for Resource Scheduling, 2021 World Conference on Computing and Communication Technologies, pp. 1-4.
Azimi et al., Energy-Efficient Deep Reinforcement Learning Assisted Resource Allocation for 5G-RAN Slicing, IEEE Transactions on Vehicular Technology, 2021, pp. 1-16.
Wang et al., , A Bottom-up Network Slicing Procedure in F-RAN, 2020 IOP Conf. Ser.: Mater. Sci. Eng. 750 012208, pp. 1-7.
Xiang et al., A Realization of Fog-RAN Slicing via Deep Reinforcement Learning, IEEE Transactions on Wireless Communications, vol. 19, No. 4, Apr. 2020, pp. 1-13.
Wang et al., Reinforcement Learning Based Resource Allocation for Network Slicing in 5G C-RAN, 2019 IEEE, pp. 1-6.
International Search Report, for PCT/US22/20788, filed on Mar. 17, 2022, with a mailing date of Jul. 7, 2022.
Liu et al., Resource Allocation Method for Network Slicing Using Constrained Reinforcement Learning, 2021 IFIP Networking Conference (IFIP Networking), pp. 1-3.
Addad et al., Toward Using Reinforcement Learning for Trigger Selection in Network Slice Mobility, IEEE Journal on Selected Areas in Communications, vol. 39, No. 7, Jul. 2021, pp. 1-13.
Elfatih et al., Internet of vehicle's resource management in 5G networks using AI technologies: Current status and trends, IET Commun. 2021;pp. 1-21.
Mei et al., Intelligent Radio Access Network Slicing for Service Provisioning in 6G: A Hierarchical Deep Reinforcement Learning Approach, IEEE Transactions on Communications, vol. 69, No. 9, Sep. 202, pp. 1-16.
Tian et al., Multi-Agent Deep Reinforcement Learning Based Resource Allocation for Heterogeneous QoS Guarantees for Vehicular Networks, IEEE Internet of Things Journal, 2021, pp. 1-14.

\* cited by examiner

Algorithm 1 Learning Optimum Policy Using DQN

1: Select $\{\gamma,\epsilon\}$ $[0,1]$, $\rho \in (0,1]$, $n \in \{1, 2,...,D\}$;
2: Create DNN model and target model with weights w and $\hat{w}$, respectively;
3: Initialize: w, $\hat{w}$, the replay memory M with size $D$;
4: Initialize: $s$;
5: for $t = 0,1,2,...,T$ do
6:    Take action $a_t$ according to $\pi = \epsilon$-greedy, and observe $r_t$ and $s_{t+1}$;
7:    Append the observation $(s_t, a_t, r_t, s_{t+1})$ to M;
8:    $s \leftarrow s_{t+1}$;
9:    Sample a random minibatch of n observations from M;

10:   for $j = 1,2,...,n$ do
11:     Predict $\hat{Q}_j(s_j|\hat{w})$;
12:     $\hat{Q}_j[a_j] = \begin{cases} r_j & \text{if } t+1 = T, \\ r_j + \gamma \max_{a'} \hat{Q}_j(s', a'|\hat{w}) & \text{otherwise.} \end{cases}$
13:     Fit the DNN model for $(s_j, \hat{Q}_j)$ by applying gradient descent step on $(\hat{Q}_j - \tilde{Q}_j)^2$ with respect to w;
14:   end for
15: if $(t \bmod \tau) = 0$ then
16:    $\hat{w} \leftarrow \rho w + (1 - \rho)\hat{w}$;
17: end if
18: if w converges then
19:    $w^* \leftarrow w$;
20:    break
21:   end if
22: end for
23: Use $w^*$ to estimate $Q^*(s,a)$ required for $\pi^*$ using (15)

FIG. 4

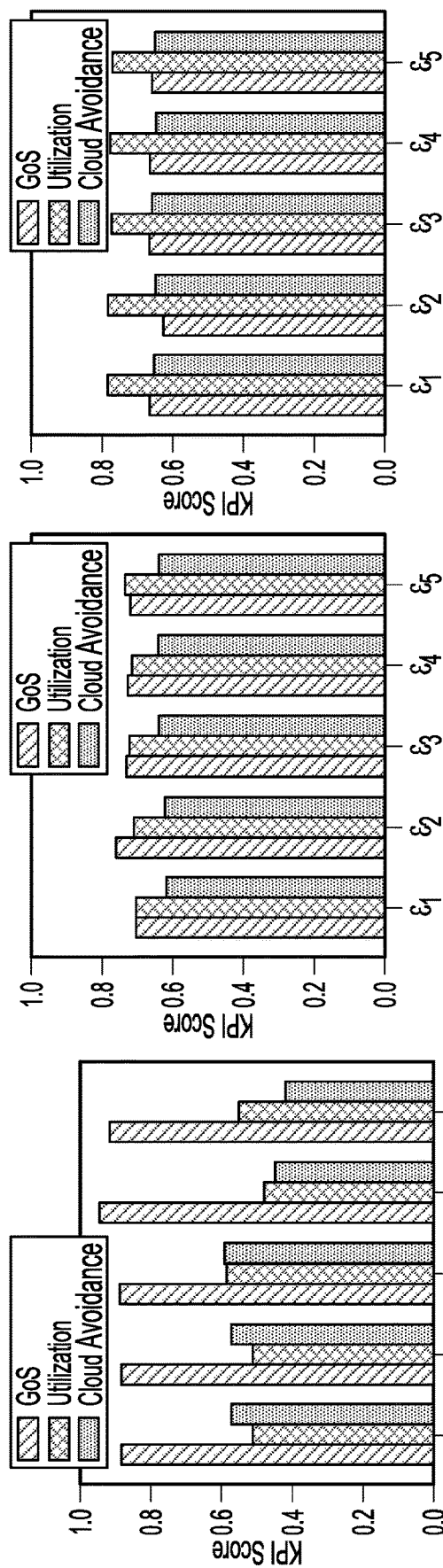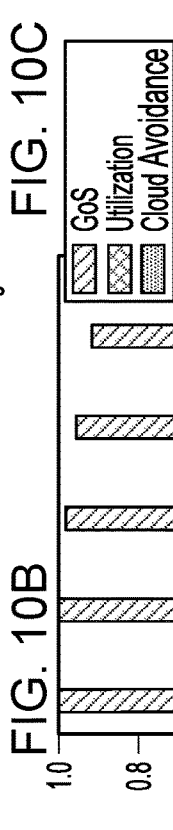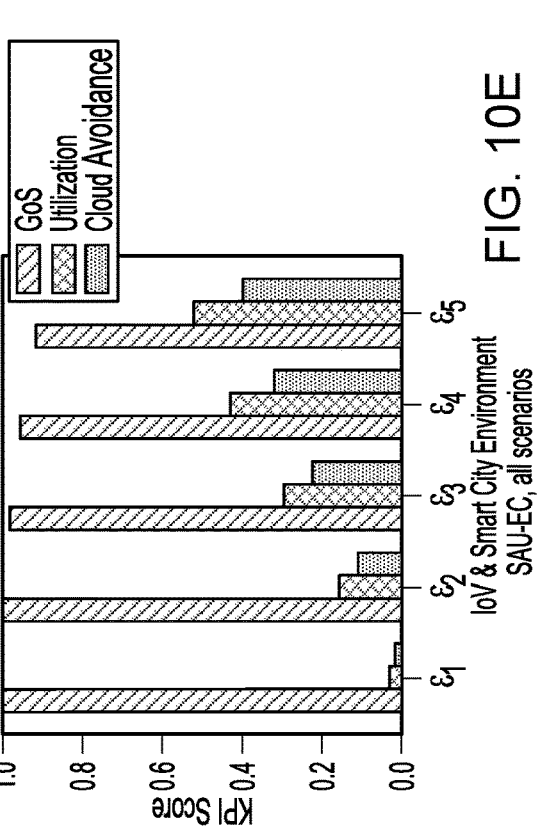
FIG. 10A
FIG. 10B
FIG. 10C
FIG. 10D
FIG. 10E

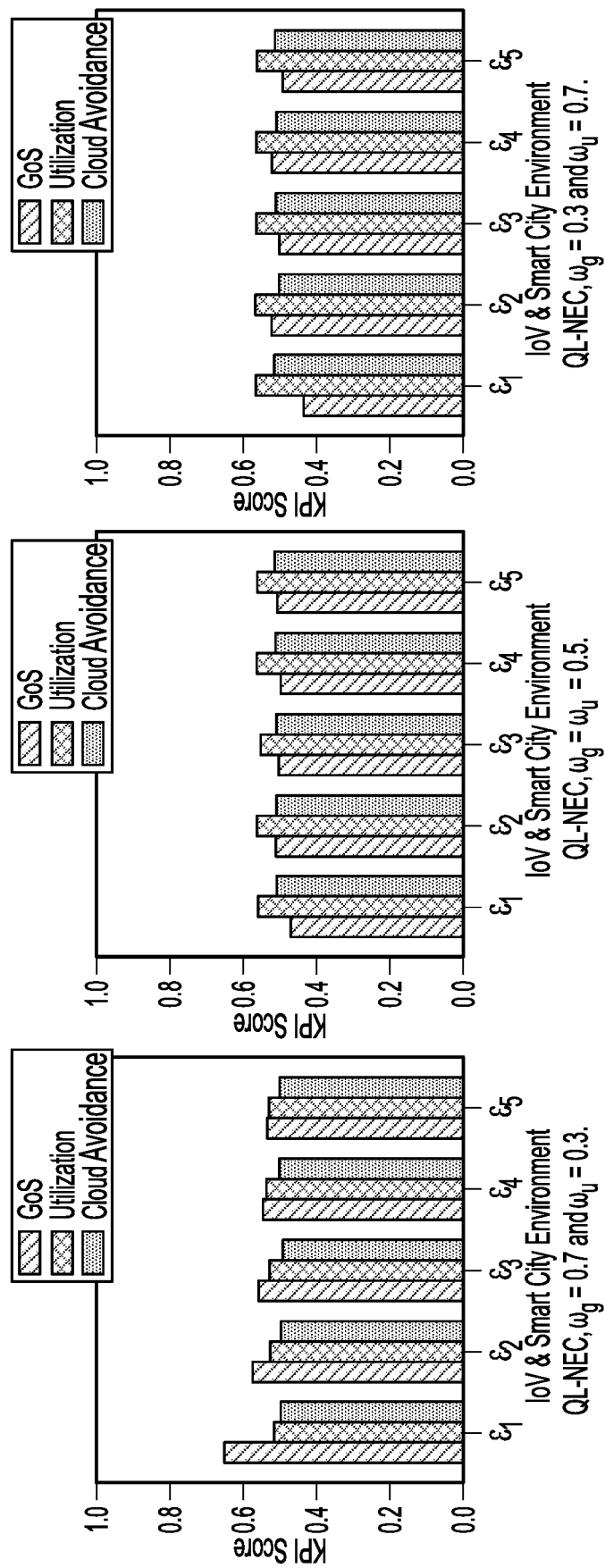

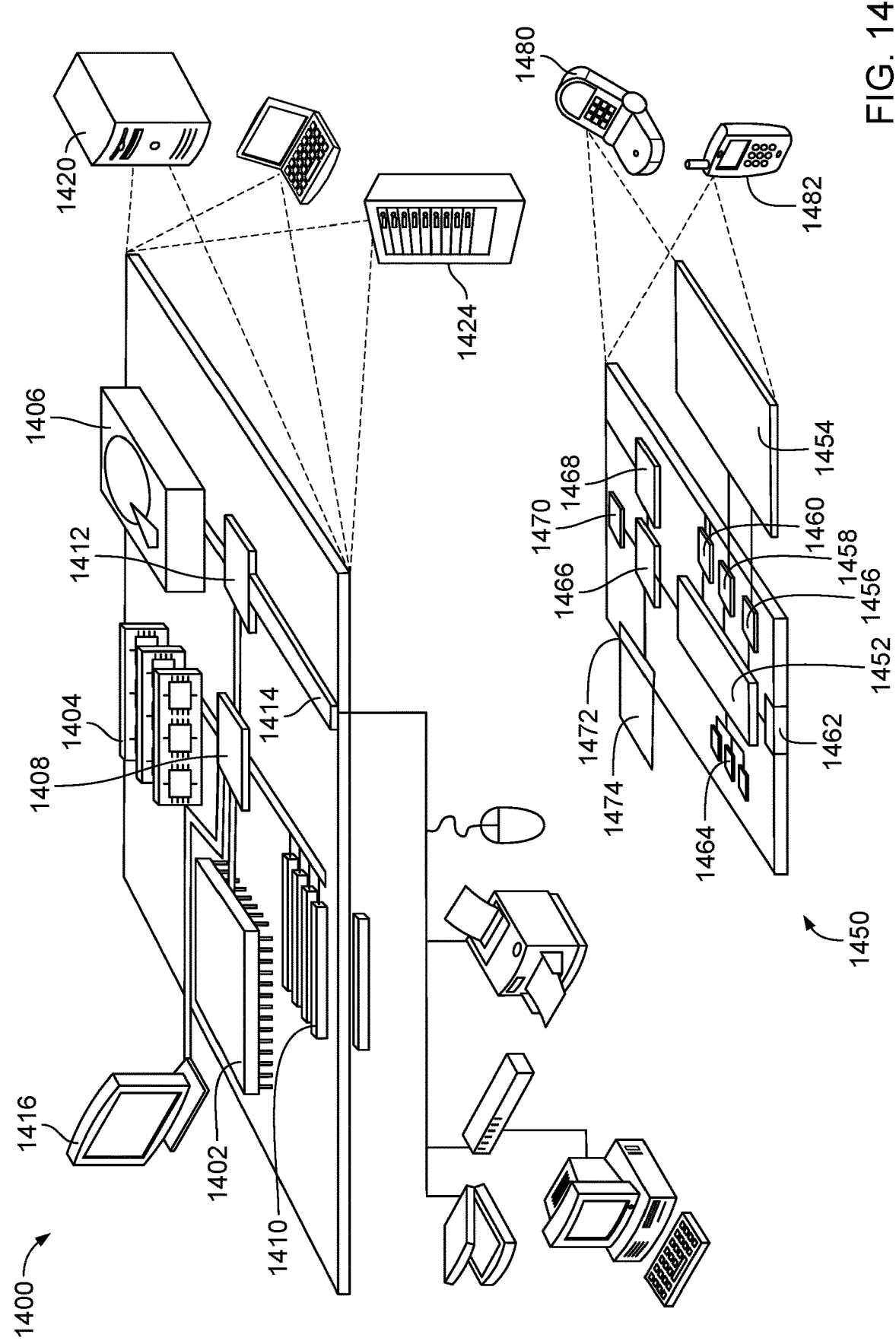

DEEP REINFORCEMENT LEARNING FOR ADAPTIVE NETWORK SLICING IN 5G FOR INTELLIGENT VEHICULAR SYSTEMS AND SMART CITIES

INCORPORATION BY REFERENCE

This application claims priority to PCT Application No. US22/20788, filed on Jun. 13, 2022, by the same inventors, which claims priority to U.S. Provisional Application Ser. No. 63/169,501, filed on Apr. 1, 2021, the disclosures of which are incorporated by reference in their entireties.

TECHNICAL FIELD

This document generally describes devices, systems, and methods related to resolving network slicing problems in allocating limited edge computing and processing resources in a fog radio access network (F-RAN).

BACKGROUND

Intelligent vehicular systems and smart city applications can be fast growing Internet of things (IoT) implementations. Fifth generation (5G) wireless communication systems can enable significant IoT with deeper coverage, high data rates of multi giga-bit-per-second (Gbps), low latency, and reliable mobile connectivity. IoT devices can constitute 50% of the 29.3 billion connected devices globally by 2023, where Internet of Vehicles (IoV) and smart city applications can be one of the fastest growing IoT implementations, having annual growth rates of 30% and 26%, respectively. The emerging new breed of IoT applications can involve video analytics, augmented reality (AR), virtual reality (VR), and artificial intelligence (AI), which can produce an annual worldwide data volume of 4.8 zettabyte by 2022. This can be more than 180 times the data traffic in 2005. Equipped with variety of sensors, radars, lidars, ultra-high definition (UHD) video cameras, GPS, navigation system, and infotainment facilities, a connected and autonomous vehicle (CAV) can generate 4.0 terabyte of data in a day, of which 1.0 gigabyte may be processed every second.

SUMMARY

The document generally describes technology that addresses latency and big data challenges of large scale IoT device deployments, such as intelligent vehicular systems and smart city environments, which can consume large amounts of network resources like radio bandwidth (e.g., 5G wireless network bandwidth), caching and storage, and computing and signal processing resources. Intelligent vehicular systems and smart city applications are currently fast growing Internet of things (IoT) implementations at a compound annual growth rate of 30%. In view of recent advances in IoT devices and the emerging new breed of IoT applications driven by artificial intelligence (AI), fog radio access network (F-RAN) can be introduced for fifth generation (5G) wireless communications to overcome latency limitations of cloud-RAN (C-RAN). The disclosed technology considers a network slicing problem of allocating limited resources at the network edge (fog nodes) to vehicular and smart city users with heterogeneous latency and computing demands in dynamic environments. The disclosed technology provides for a network slicing model based on a cluster of fog nodes (FNs) coordinated with an edge controller (EC) to efficiently utilize the limited resources at the network edge and satisfy heterogenous latency requirements. For each service request in a cluster, the EC can determine which FN to execute the task, i.e., locally serve the request at the edge, or to reject the task and refer it to the cloud. The disclosed technology can be formulated with an infinite-horizon Markov decision process (MDP) and deep reinforcement learning (DRL) to adaptively learn an optimal slicing policy. Performance of the proposed DRL-based slicing method can be evaluated by comparing it with other slicing approaches in dynamic environments and for different scenarios of design objectives. Simulation results, as described herein, can corroborate that the proposed DRL-based EC can quickly learn an optimal policy through interaction with an environment, which enables adaptive and automated network slicing for efficient resource allocation in dynamic vehicular and smart city environments.

In addition to the embodiments of the attached claims and the embodiments described above, the following numbered embodiments are also innovative.

Embodiment 1 is a system for processing a service request within a network environment, the system comprising: a first cluster of fog nodes configured to execute one or more service tasks that are received from the network environment, wherein the first cluster of fog nodes includes a primary fog node and nearest neighbor fog nodes of the primary fog node, the primary fog node configured to: receive, from the network environment, a service request, wherein the service request includes a first time and a utility; and determine, based on the service request, service request resource data, wherein the service request resource data includes the first time, a quantity of resource blocks required to serve the service request, and a hold time required to serve the service request locally by any one of the nearest neighbor fog nodes or the primary fog node; and an edge controller communicatively connected to the network environment and the first cluster of fog nodes, the edge controller configured to: receive, from the primary fog node, the service request resource data; identify, based on the service request resource data, available resources at the nearest neighbor fog nodes and the primary fog node; determine whether the nearest neighbor fog nodes or the primary fog node have resource blocks available to fulfill the service request; identify, using a deep reinforcement learning (DRL) algorithm, that the service request can be fulfilled in response to determining that (i) the nearest neighbor fog nodes or the primary fog node have the resource blocks available to fulfill the service request and (ii) expected future reward for saving the resource blocks available to fulfill the service request for future service requests is less than an expected reward associated with serving the service request at another of the nearest neighbor fog nodes or the primary fog node; and serve the service request at one of the nearest neighbor fog nodes or the primary fog node based on determining that (i) the one of the nearest neighbor fog nodes or the primary fog node has the resource blocks available to fulfill the service request and (ii) the expected future reward for saving the resource blocks available is less than the expected reward associated with serving the service request at the another of the nearest neighbor fog nodes or the primary fog node.

Embodiment 2 is the system of embodiment 1, further comprising a second cluster of fog nodes communicatively connected to the network environment and the edge controller, wherein the first cluster of fog nodes services a first geographic area in the network environment and the second cluster of fog node services a second geographic area in the network environment, wherein the first geographic area is different than the second geographic area.

Embodiment 3 is the system of any one of embodiments 1 through 2, wherein the edge controller is the primary fog node or one of the nearest neighbor fog nodes in the first cluster of fog nodes.

Embodiment 4 is the system of any one of embodiments 1 through 3, wherein the edge controller is centrally located in a geographic area of the first cluster of fog nodes.

Embodiment 5 is the system of any one of embodiments 1 through 4, wherein the primary fog node and the nearest neighbor fog nodes in the first cluster of fog nodes are communicatively connected via optical links.

Embodiment 6 is the system of any one of embodiments 1 through 5, wherein the primary fog node is located in a geographic area that is closest to the service request received from the network environment.

Embodiment 7 is the system of any one of embodiments 1 through 6, wherein the edge controller is further configured to learn, using the DRL algorithm, how to (i) allocate limited resources in the first cluster of fog nodes for each service request and (ii) maximize grade-of-service (GoS), wherein the GoS is a proportion of a quantity of served high-load service requests to a total number of high-load service requests in the first cluster of fog nodes.

Embodiment 8 is the system of any one of embodiments 1 through 7, wherein the edge controller is further configured to assign a reward for serving the service request.

Embodiment 9 is the system of any one of embodiments 1 through 8, wherein the edge controller is further configured to serve the service request based on determining that the expected reward associated with serving the service request exceeds a threshold value.

Embodiment 10 is the system of any one of embodiments 1 through 9, wherein the expected reward associated with serving the service request is greater for serving a low-load service request than serving a high-load service request.

Embodiment 11 is the system of any one of embodiments 1 through 10, wherein the edge controller is configured to assign a negative reward when the edge controller rejects the low-load service request.

Embodiment 12 is the system of any one of embodiments 1 through 11, wherein the edge controller is configured to assign a positive reward when the edge controller rejects the high-load service request having a same utility as a utility of the low-load service request.

Embodiment 13 is the system of any one of embodiments 1 through 12, wherein the edge controller is configured to assign, when the first cluster of fog nodes are busy, a reward for (i) serving the high-load service request, (ii) serving the low-load service request, (iii) rejecting the high-load service request, (iv) rejecting the low-load service request, (v) rejecting the high-load service request when the first cluster of fog nodes are busy, and (vi) rejecting the low-load service request.

Embodiment 14 is the system of any one of embodiments 1 through 13, wherein the edge controller is trained to allocate limited resources in the first cluster of fog nodes using a Deep Q-Network (DQN).

Embodiment 15 is the system of any one of embodiments 1 through 14, wherein the DQN comprises a deep neural network (DNN) structure with an input layer of a first threshold quantity of neurons, a second threshold quantity of hidden layers, wherein each of the hidden layers has a third threshold quantity of neurons, and an output layer having a fourth threshold quantity of neurons.

Embodiment 16 is the system of any one of embodiments 1 through 15, wherein the service request includes at least one of (i) providing smart lighting and automating public buildings, (ii) managing air quality and monitoring noise, (iii) determining and providing smart waste management and energy consumption management, (iv) providing smart parking assistance, (v) providing in-vehicle audio and video infotainment, (vi) executing a driver authentication service, (vii) monitoring structural health of buildings, (viii) managing and providing safe share rides, (ix) executing a smart amber alerting system, (x) executing a driver distraction alerting system, and (xi) monitoring autonomous driving, wherein the service request is associated with a geographic area of the network environment.

Embodiment 17 is the system of any one of embodiments 1 through 16, wherein the edge controller is further configured to serve the service request based on determining that serving the service request achieves one or more key performance indicators (KPIs) for the network environment, wherein the KPIs include at least one of (i) GoS, (ii) resource utilization, (iii) cloud avoidance, and (iv) overall performance.

Embodiment 18 is the system of any one of embodiments 1 through 17, wherein the edge controller is further configured to: receive, from a second primary node of the second cluster of fog nodes, second service request data; identify, based on the second service request resource data, available resources at nearest neighbor fog nodes of the second cluster of fog nodes and the second primary fog node; determine whether the nearest neighbor fog nodes of the second cluster of fog nodes or the second primary fog node have resource blocks available to fulfill the service request; reject, using the DRL algorithm, a second service request associated with the second service request data in response to determining that (i) the nearest neighbor fog nodes of the second cluster of fog nodes or the second primary fog node do not have the resource blocks available to fulfill the second service request or (ii) the expected future reward for saving the resource blocks available to fulfill the second service request by the second cluster of fog nodes for future service requests is greater than the expected reward associated with serving the service request at one of the nearest neighbor fog nodes of the second service request or the second primary fog node; and refer, in response to rejecting serving the service request at the second cluster of fog nodes, the second service request to the cloud computing system.

Embodiment 19 is the system of any one of embodiments 1 through 18, wherein the primary fog node is further configured to determine a priority level for serving the service request at one of the nearest neighbor fog nodes or the primary fog node.

Embodiment 20 is the system of any one of embodiments 1 through 19, wherein learning how to allocate limited resources further comprises generating an optimal policy for allocating the limited resources.

Embodiment 21 is the system of any one of embodiments 1 through 20, wherein the edge controller is configured to allocate, based on the optimal policy, resources in the first cluster of fog nodes for subsequent service requests.

Embodiment 22 is the system of any one of embodiments 1 through 21, wherein the service request includes adjusting smart lighting and automating public buildings in a geographic area associated with the network environment.

Embodiment 23 is the system of any one of embodiments 1 through 22, wherein the service request includes adjusting air quality and monitoring noise in a geographic area associated with the network environment.

Embodiment 24 is the system of any one of embodiments 1 through 23, wherein the service request includes making determinations about smart waste management and energy consumption management in a geographic area associated with the network environment.

Embodiment 25 is the system of any one of embodiments 1 through 24, wherein the service request includes smart parking assistance in a geographic area associated with the network environment.

Embodiment 26 is the system of any one of embodiments 1 through 25, wherein the service request includes audio and video infotainment in vehicles in a geographic area associated with the network environment.

Embodiment 27 is the system of any one of embodiments 1 through 26, wherein the service request includes authenticating drivers in a geographic area associated with the network environment.

Embodiment 28 is the system of any one of embodiments 1 through 27, wherein the service request includes monitoring structural health of buildings in a geographic area associated with the network environment.

Embodiment 29 is the system of any one of embodiments 1 through 28, wherein the service request includes determining and providing safe share rides in a geographic area associated with the network environment.

Embodiment 30 is the system of any one of embodiments 1 through 29, wherein the service request includes execution of a smart amber alerting system in a geographic area associated with the network environment.

Embodiment 31 is the system of any one of embodiments 1 through 30, wherein the service request includes execution of driver distraction alerting systems in a geographic area associated with the network environment.

Embodiment 32 is the system of any one of embodiments 1 through 31, wherein the service request includes providing and managing autonomous driving in a geographic area associated with the network environment.

Embodiment 33 is a method for processing a service request within a network environment, the method comprising: receiving, by an edge controller from a primary fog node in a first cluster of fog nodes, a service request resource data for a service request, wherein the first cluster of fog nodes is configured to execute service tasks received from the network environment, the first cluster of fog nodes further including nearest neighbor fog nodes of the primary fog node; identifying, by the edge controller and based on the service request resource data, available resources at the nearest neighbor fog nodes and the primary fog node; determining, by the edge controller, whether the nearest neighbor fog nodes or the primary fog node have resource blocks available to fulfill the service request; identifying, by the edge controller and using a DRL algorithm, that the service request can be fulfilled in response to determining that (i) the nearest neighbor fog nodes or the primary fog node have the resource blocks available to fulfill the service request and (ii) expected future reward for saving the resource blocks available to fulfill the service request for future service requests is less than an expected reward associated with serving the service request at another of the nearest neighbor fog nodes or the primary fog node; and serving, by the edge controller, the service request at one of the nearest neighbor fog nodes or the primary fog node based on determining that (i) the one of the nearest neighbor fog nodes or the primary fog node has the resource blocks available to fulfill the service request and (ii) the expected future reward for saving the resource blocks available is less than the expected reward associated with serving the service request at the another of the nearest neighbor fog nodes or the primary fog node.

Embodiment 34 is the method of embodiment 33, wherein: the service request is received, by the primary fog node and from the network environment, the service request including a timestamp and a utility, and the service request resource data includes the timestamp, a quantity of resource blocks required to serve the service request, and a hold time required to serve the service request locally by any one of the nearest neighbor fog nodes or the primary fog node.

Embodiment 35 is the method of any one of embodiments 33 through 34, wherein the edge controller is the primary fog node or one of the nearest neighbor fog nodes in the first cluster of fog nodes.

Embodiment 36 is the method of any one of embodiments 33 through 35, wherein the edge controller is centrally located in a geographic area of the first cluster of fog nodes.

Embodiment 37 is the method of any one of embodiments 33 through 36, further comprising learning, by the edge controller and using the DRL algorithm, how to (i) allocate limited resources in the first cluster of fog nodes for each service request and (ii) maximize grade-of-service (GoS), wherein the GoS is a proportion of a quantity of served high-load service requests to a total number of high-load service requests in the first cluster of fog nodes.

Embodiment 38 is the method of any one of embodiments 33 through 33, further comprising assigning, by the edge controller, a reward for serving the service request.

Embodiment 39 is the method of any one of embodiments 33 through 38, further comprising serving, by the edge controller, the service request based on determining that the expected reward associated with serving the service request exceeds a threshold value.

Embodiment 40 is the method of any one of embodiments 33 through 39, wherein the expected reward associated with serving the service request is greater for serving a low-load service request than serving a high-load service request.

Embodiment 41 is the method of any one of embodiments 33 through 40, further comprising assigning, by the edge controller, a negative reward based on rejecting, by the edge controller, the low-load service request.

Embodiment 42 is the method of any one of embodiments 33 through 41, further comprising assigning, by the edge controller, a positive reward based on rejecting, by the edge controller, the high-load service request having a same utility as a utility of the low-load service request.

Embodiment 43 is the method of any one of embodiments 33 through 42, further comprising assigning, by the edge controller and when the first cluster of fog nodes are busy, a reward for (i) serving the high-load service request, (ii) serving the low-load service request, (iii) rejecting the high-load service request, (iv) rejecting the low-load service request, (v) rejecting the high-load service request when the first cluster of fog nodes are busy, and (vi) rejecting the low-load service request.

Embodiment 44 is the method of any one of embodiments 33 through 43, further comprising serving, by the edge controller, the service request based on determining that serving the service request achieves one or more key performance indicators (KPIs) for the network environment, wherein the KPIs include at least one of (i) GoS, (ii) resource utilization, (iii) cloud avoidance, and (iv) overall performance.

Particular embodiments described herein include a system for processing a service request within a network environment. The system can include a first cluster of fog nodes that can execute one or more service tasks that are received from the network environment. The first cluster of fog nodes can include a primary fog node and nearest neighbor fog nodes of the primary fog node. The primary fog node can be configured to receive, from the network environment, a service request. The service request can include a first time and a utility. The primary fog node can also determine, based on the service request, service request resource data. The service request resource data can include the first time, a quantity of resource blocks required to serve the service request, and a hold time required to serve the service request locally by any one of the nearest neighbor fog nodes or the primary fog node. The system can also include an edge controller communicatively connected to the network environment and the first cluster of fog nodes. The edge controller can be configured to receive, from the primary fog node, the service request resource data, identify, based on the service request resource data, available resources at the nearest neighbor fog nodes and the primary fog node, and determine whether the nearest neighbor fog nodes or the primary fog node have resource blocks available to fulfill the service request. The edge controller can identify, using a deep reinforcement learning (DRL) algorithm, that the service request can be fulfilled in response to determining that (i) the nearest neighbor fog nodes or the primary fog node have the resource blocks available to fulfill the service request and (ii) expected future reward for saving the resource blocks available to fulfill the service request for future service requests is less than an expected reward associated with serving the service request at one of the nearest neighbor fog nodes or the primary fog node. The edge controller can serve the service request at the identified one of the nearest neighbor fog nodes or the primary fog node. The edge controller can also reject, using the DRL algorithm, the service request in response to determining that (i) the nearest neighbor fog nodes or the primary fog node do not have the resource blocks available to fulfill the service request or (ii) the expected future reward for saving the resource blocks available to fulfill the service request for future service requests is greater than the expected reward associated with serving the service request at one of the nearest neighbor fog nodes or the primary fog node. The edge controller can refer, in response to rejecting serving the service request at the first cluster of fog nodes, the service request to a cloud computing system. The cloud computing system can be communicatively connected to at least one of the network environment, the first cluster of fog nodes, and the edge controller. The cloud computing system can be configured to execute service requests that are referred, by the edge controller, to the cloud computing system for execution.

In some implementations, the system can optionally include one or more of the following features. For example, the system can further include a second cluster of fog nodes communicatively connected to the network environment and the edge controller. The first cluster of fog nodes can service a first geographic area in the network environment and the second cluster of fog node can service a second geographic area in the network environment. The first geographic area can be different than the second geographic area.

As another example, the edge controller can be the primary fog node or one of the nearest neighbor fog nodes in the first cluster of fog nodes. The edge controller can be centrally located in a geographic area of the first cluster of fog nodes. The primary fog node and the nearest neighbor fog nodes in the first cluster of fog nodes can be communicatively connected via optical links. The primary fog node can be located in a geographic area that is closest to the service request received from the network environment.

As another example, the primary fog node can also be configured to determine a priority level for serving the service request at one of the nearest neighbor fog nodes or the primary fog node. The edge controller can also be further configured to learn, using the DRL algorithm, how to (i) allocate limited resources in the first cluster of fog nodes for each service request and (ii) maximize grade-of-service (GoS). The GoS can be a proportion of a quantity of served high-load service requests to a total number of high-load service requests in the first cluster of fog nodes.

As another example, the edge controller can assign a reward for serving the service request. The edge controller can serve the service request based on determining that the expected reward associated with serving the service request exceeds a threshold value. The expected reward associated with serving the service request can be greater for serving a low-load service request than serving a high-load service request. The edge controller can assign a negative reward when the edge controller rejects the low-load service request. The edge controller can assign a positive reward when the edge controller rejects the high-load service request having a same utility as a utility of the low-load service request. The edge controller can also be configured to assign a reward for (i) serving the high-load service request, (ii) serving the low-load service request, (iii) rejecting the high-load service request, (iv) rejecting the low-load service request, (v) rejecting the high-load service request when the first cluster of fog nodes are busy, and (vi) rejecting the low-load service request when the first cluster of fog nodes are busy.

As yet another example, the edge controller can learn how to allocate limited resources in the first cluster of fog nodes using a Deep Q-Network (DQN). The DQN can include a deep neural network (DNN) structure with an input layer of 18 neurons, 2 hidden layers of 64 and 24 neurons, respectively, and an output layer of 8 neurons. Learning how to allocate limited resources further can include generating an optimal policy for allocating the limited resources, wherein the edge controller can allocate, based on the optimal policy, resources in the first cluster of fog nodes for subsequent service requests. The service request can also include at least one of (i) smart lighting and automation of public buildings, (ii) air quality management and noise monitoring, (iii) smart waste management and energy consumption management, (iv) smart parking assistance, (v) in-vehicle audio and video infotainment, (vi) driver authentication service, (vii) structural health monitoring, (viii) safe share rides, (ix) smart amber alerting system, (x) artificial intelligence driven and video analytics tracking service, (xi) drive distraction alerting system, and (xii) autonomous driving. Moreover, the edge controller can also be configured to serve the service request based on determining that serving the service request achieves one or more key performance indicators (KPIs) for the network environment. The KPIs can include at least one of (i) GoS, (ii) resource utilization, (iii) cloud avoidance, and (iv) overall performance.

The devices, system, and techniques described herein may provide one or more of the following advantages. For example, the disclosed technology can provide for resolving a network slicing problem of adaptively allocating limited edge computing and processing resources in F-RAN to dynamic IoV and smart city applications with heterogeneous latency demands and diverse computing loads. The disclosed technology can provide for efficient use of computing and signal processing resources at an edge controller to support different computing loads. Thus, the disclosed technology can ensure that user quality of service demands can be efficiently met as well as optimized. The disclosed technology can also ensure that resources are efficiently utilized in complex computing environments and settings. The disclosed technology can therefore provide for reinforcement learning and deep reinforcement learning to dynamically improve network slicing and resource allocation in growing population sizes of users.

As another example, the disclosed technology provides for soft network slicing, which can adapt to dynamic environments and heterogeneous user requirements. Hard network slicing, on the other hand, can require physical allocation of bandwidth, memory, and computing resources, which can be costly and impractical. Hard network slicing can require physical shifting and changes in radio, storage, and computing resources at nodes in a network as population of users for each slice changes over time for wireless and mobile applications. Hard network slicing can also cause delays between guaranteed transmission and remove radio units. The disclosed technology, therefore, can provide for more dynamic and less costly adjustment of resources to accommodate for growing populations of users.

As another example, the disclosed technology, such as edge controllers, can provide for smarter decision making in allocating fog node resources to therefore lower latency applications that satisfy quality of service and intelligently utilize the edge slice. The disclosed technology may not depend on users' decisions to join the fog RAN platform or not. Relying on user decisions can increase signaling on control channels due to paging messages that can also cause larger delays and waste fog node resources. The disclosed technology, on the other hand, can ensure that fog node resources are used efficiently rather than wasted.

As yet another example, the disclosed technology provides for distributed edge controllers to manage resource allocation of clusters of neighboring fog nodes. Using a centralized controller for an entire network can have latency limitations, especially for low latency applications. For example, the centralized controller can assume infinite buffers and hold received requests for a certain amount of time until a resource allocation decision can be made. The disclosed technology, on the other hand, can be advantageous to satisfy low latency requests and maximize grade of service. The disclosed technology can be based on online and quick decision making for every received service request.

The details of one or more implementations are set forth in the accompanying drawings and the description below. Other features and advantages will be apparent from the description and drawings, and from the claims.

BRIEF DESCRIPTION OF THE DRAWINGS

FIG. 4 illustrates a deep reinforcement learning (DRL) algorithm for how the edge controller can learn an optimal policy for a considered Markov decision process (MDP).

FIGS. 10A-H are graphs depicting scores of three individual KPIs, GoS, resource utilization, and cloud avoidance when the edge controller applies the proposed DRL algorithm of FIG. 4 and different baseline algorithms described herein in three scenarios.

FIG. 14 is a schematic diagram that shows an example of a computing device and a mobile computing device.

Like reference symbols in the various drawings indicate like elements.

DETAILED DESCRIPTION OF ILLUSTRATIVE EMBODIMENTS

Figure 1:
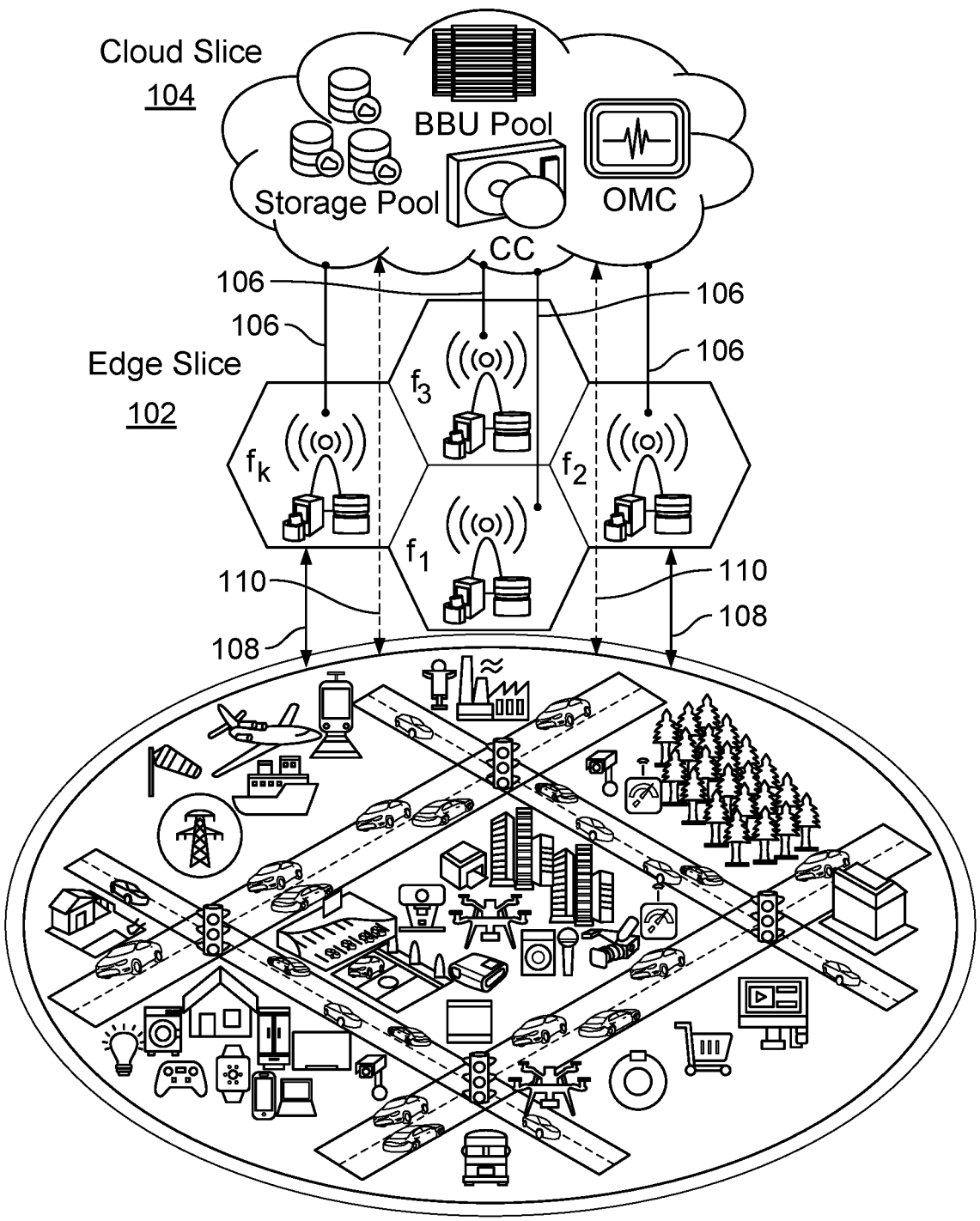
FIG. 1 is an example network slicing model using the disclosed technology.

The disclosed technology provides for network slicing as a cost-effective solution for mobile operators and service providers to satisfy various user quality of service. The disclosed technology can provide for resolving a network slicing problem of adaptively allocating limited edge computing and processing resources in F-RAN to dynamic IoV and smart city applications with heterogeneous latency demands and diverse computing loads. Centralization of network functionalities via virtualization through a cloud radio access network (C-RAN) architecture can address big data challenges of massive IoT. In C-RAN, densely-deployed disseminated remote radio units (RRUs) can be connected through high capacity fronthaul trunks to a cloud controller (CC) where they share a pooling of storage and baseband units (BBUs). The centralized computing, processing, and collaborative radio in C-RAN can improve network security, flexibility, availability, and spectral efficiency. It can also simplify network operations and management, enhances capacity, and reduces energy usage. However, considering the fast growing demands of IoT deployments, C-RAN can impose some onus on cloud computing and fronthaul links, and can dictate delays that can be caused by large return transmission times, finite-capacity fronthaul trunks, and flooded cloud processors. The latency limitation in C-RAN can make it challenging to meet desired quality-of-service (QoS) requirements, especially for delay-sensitive IoV and smart city applications.

Thus, the disclosed technology provides adaptive deep reinforcement learning (DRL) techniques to resolve heterogeneous latency challenges in largescale IoT deployments. The disclosed technology also provides dynamic environments to satisfy users' QoS requirements through intelligently utilizing limited edge computing and signal processing resources. Moreover, the disclosed technology provides for independently deciding on service requests at the edge without referring to the cloud.

Hence, an evolved architecture of fog RAN (F-RAN) can extend operations and services of cloud to the edge. In F-RAN, fog nodes (FNs) are not only restricted to perform the regular radio frequency (RF) functionalities of RRUs, but are also equipped with computing, storage, and processing resources to afford low latency demand by delivering network functionalities directly at the edge and independently from the cloud. However, due to their limited resources compared to the cloud, FNs may be unable to serve all requests from IoV and smart city applications. Thus, they should utilize their limited resources intelligently to satisfy the QoS requirements in synergy and complementarity with the cloud.

Moreover, IoV and smart city applications can demand various computing, throughput, latency, availability, and reliability requirements to satisfy a desired level of QoS. For instance, in-vehicle audio, news, and video infotainment services can be satisfied by traditional mobile broadband (MBB) services of high throughput and capacity with latency greater than 100 ms. Cloud computing can play an essential role for such delay-tolerant applications. Other examples of delay-tolerant applications can include smart parking, intelligent waste management, infrastructure (e.g., bridges, railways, etc.) monitoring, air quality management, noise monitoring, smart city lighting, smart management of city energy consumption, and automation of public buildings such as schools, museums, and administration offices to automatically and remotely control lighting and air condition.

On the other hand, latency and reliability can be more critical for other IoV and smart city applications. For instance, deployment scenarios based on enhanced mobile broadband (eMBB) can require latency of 4.0 ms. Enhanced vehicle-to-everything (eV2X) applications can demand 3-10 ms latency with packet loss rate of $10^{-5}$. Ultra-reliable and low-latency communications (URLLC) can seek latency level of 0.5-1.0 ms and 99.999% reliability, e.g., autonomous driving. AI-driven and video analytics services can be considered both latency-critical and compute-intensive applications. For instance, real-time video streaming for traffic management in intelligent transportation system (ITS) can require a frame rate of 100 Hz, which can correspond to a latency of 10 ms between frames. Future electric vehicles (EVs) and CAVs can be viewed as computers on wheels (COWs) rather than cars because they are equipped with super computers to execute intensive computing tasks that can include video analytics and AI-driven functionalities. However, with high power consumption associated with such intense computing, COWs capabilities can be bounded in terms of computing power, storage, and battery life. Hence, computing offloading to fog and cloud networks can be employed. This can especially be the case in a dynamic traffic and load profiles of dense IoV and smart city service requests with heterogeneous latency and computing needs, partitioning RAN resources virtually, i.e., network slicing, which can assure service customization.

As described herein, network slicing can be introduced for the evolving 5G and beyond communication technologies as a cost-effective solution for mobile operators and service providers to satisfy various user QoS. In network slicing, a heterogeneous network of various access technologies and QoS demands that share a common physical infrastructure can be logically divided into virtual network slices to improve network flexibility. Each network slice can act as an independent end-to-end network and can support various service requirements and a variety of business cases and applications. The disclosed technology can provide for resolving a network slicing problem of adaptively allocating limited edge computing and processing resources in F-RAN to dynamic IoV and smart city applications with heterogeneous latency demands and diverse computing loads.

The disclosed technology can provide for sequentially allocating FNs' limited resources at the network edge to various vehicular and smart city applications with heterogeneous latency needs in dynamic traffic and load profiles while efficiently utilizing the edge resources. Thus, the disclosed technology can provide for developing a network slicing model based on edge clustering to efficiently utilize the computing and signal processing resources at the edge, and proposing a Markov decision process (MDP) formulation for the considered network slicing problem. The disclosed technology can also provide for a theoretical basis for learning optimal MDP policies using deep reinforcement learning (DRL) methods, and showing how to implement deep Q-networks (DQN), a DRL method, to adaptively learn the optimal network slicing policy, thereby ensuring that both user QoS demands and efficient resource utilization can be met. The disclosure described herein can also present simulation results to examine the performance and adaptivity of the proposed DQN-based network slicing method in diverse intelligent vehicular systems and smart city environments.

The disclosed technology can address a realistic network slicing problem for efficiently allocating edge resources in a diverse IoV and smart city environment. Firstly, dealing with a single fog node may not depict desired network slicing in 5G. A more realistic model, as described herein, can consider a network of multiple coordinated fog nodes, and a comprehensive set of system state variables. Secondly, a centralized cloud network slicing approach to manage resource allocation among various network slices may not be suitable for delay-sensitive implementations, such as URLLC-based IoV, V2X, and smart city applications, such as autonomous driving. On the other hand, the disclosed technology can provide an independent edge DRL agent that can avoid large transmission delays and satisfy desired level of QoS at FNs by closely interacting with the IoV and smart city environment and making local real-time decisions. Thirdly, the nature of many smart city and IoV applications can demand continuous edge capabilities in a service area (e.g., autonomous vehicles can be anywhere), hence radio, caching and computing resources should be available at an edge controller. In practice, the demand for delay-sensitive and high-data-rate services can dynamically vary, and as a result the fixed URLLC slice and MBB slice approach may cause inefficient utilization of edge resources. For instance, the URLLC slice can be underutilized during light demand for delay-sensitive services. A more flexible network slicing method, as described herein, can more efficiently utilize the edge resources while also satisfying the desired QoS. Lastly, hierarchical network slicing architecture and physical resource changes may not address dynamic environments in a cost-efficient manner. It can be costly for cellular operators and service providers to keep adding or transferring further infrastructural assets, i.e., capital expenditure which can include transceivers (TRX) and other radio resources, computing and signal processing resources such as, BBUs, CPUs and GPUs, as well as caching resources and storage data centers. Such network changes can be considered part of network expansion plans over time. This disclosure, therefore, is generally related to a cost-efficient virtual and adaptive network slicing method in F-RAN.

Referring to the figures, FIG. 1 is an example network slicing model using the disclosed technology. More specifically, the example network is a F-RAN network slicing model for IoV and smart city environments 100. Two logical network slices, cloud slice 104 and edge slice 102, can support multiple radio access technologies and serve heterogeneous latency needs and resource requirements in dynamic IoV and smart city environments 100. The edge slice 102 can be connected to the cloud slice 104 through high-capacity fronthaul links represented by solid lines 106 in FIG. 1. Solid arrows 108 can represent edge service to satisfy QoS. Dashed arrows 110 can represent task referral to the cloud slice 104 to save the limited resources of the edge slice 102.

A hexagonal structure represents coverage area of fog nodes (FNs) in the edge slice 102, where each hexagon can exemplify an FN's footprint, i.e., its serving zone. An FN in an edge cluster can be connected through fast and reliable optical links with its adjacent FNs whose hexagons can have a common side with it. FNs in the edge slice can also be connected via high-capacity fronthaul links to the cloud slice 104, which can include a cloud controller (CC) of computing capabilities, a pool of storage capacity, centralized baseband units (BBUs), and an operations and maintenance center (OMC), which can monitor key performance indicators (KPIs) and generate network reports. To ensure QoS for the massive smart city and IoV service requests, especially the URLLC applications and to mitigate onus on the fronthaul and cloud, FNs can be equipped with computing and processing capabilities to independently deliver network functionalities at the edge of network.

In an environment densely populated with low-latency service requests, it can be beneficial for the FNs to route delay-tolerant applications to the cloud 104 and save limited edge 102 resources for delay-sensitive applications. In practice, smart city and IoV environments 100 can be dynamic, i.e., a typical environment may not always be densely populated with delay-sensitive applications. A rule-based network slicing policy may not ensure efficient use of edge resources in dynamic environments as it can under-utilize edge resources when delay-sensitive applications are rare. On the other hand, a statistical learning policy can adapt its decisions to the changing environment characteristics. Moreover, it can learn to prioritize low-load delay-sensitive applications over high-load delay-sensitive ones.

Edge controllers (ECs) can be used to efficiently manage the edge resources by enabling cooperation among FNs. In this approach, as depicted in FIG. 1, FNs can be grouped in clusters, each of which can cover a particular geographical area, and manage the edge resources in that area through a cluster head called EC. EC. The cluster size k can be a network design parameter which can represent a number of coordinated FNs in an edge cluster. An FN in each cluster can be appointed as EC to manage and coordinate edge resources at FNs in the cluster. The EC can be nominated by the network designer mainly based on its central geo location among the FNs in the cluster, like f1 and f3 in FIG. 1. Note that unlike the cloud controller, the edge controller can be close to end users as it can be considered one of the FNs in a cluster. Also, the cluster size k can be constrained by neighboring FNs that cover a limited service area such as a downtown, industrial area, university campus, etc.

All FNs in an edge cluster can be connected together and with the EC through speedy reliable optical links. The EC can monitor all individual FN internal states, including resource availability and received service requests, and can decide for each service request received by an FN in the cluster. For each received request, the EC can choose one of three options: serve at the receiving FN (primary FN), serve at a neighboring FN, or serve at the cloud. Each FN in the cluster can have a predefined list $N_i$ of neighboring FNs, which can help serving a received service request. For instance, $\mathcal{C} = \{f_1, f_2, \ldots, f_i^*, \ldots, f_k\}$ can be an edge cluster of size k, where $f_i^*$ can denote the EC which can be any FN in the cluster. The network designer can define a neighboring list $\mathcal{N}_i \subseteq \{\mathcal{C} - f_i^*\}$ for each FN in the cluster. An FN can handover service tasks only to its neighbors. Dealing with IoV and smart city service requests, the FN that receives a request can be called a primary FN^f. The FN that actually serves the request utilizing its resources can be called the serving FN⁻f. Depending on the EC decision, the primary FN or one of its neighbors can be the serving FN, or there can be no serving FN (for the decision to serve at the cloud).

An IoV or smart city application can attempt to access the network by sending a service request to the primary FN, which can be the closest FN to the user. The primary FN can check the utility $u \in U = \{1, 2, \ldots, u_{max}\}$, i.e., the priority level of executing the service task at the edge, analyze the task load by figuring the required amount of resources $c \in C = \{1, 2, \ldots, c_{max}\}$, and holding time of resources $h \in H = \{1, 2, \ldots, h_{max}\}$, and send the EC task input $(u_t, c_t, h_t)$ at time t. Resource capacity of the $i^{th}$ FN $f_i \in \mathcal{C}$ can be limited to $N_i$ resource blocks. Hence, a maximum number of resource blocks to be allocated for a task can be constrained by FN resource capacity, i.e., $c \leq c_{max} \leq N$. The time can be partitioned into small time steps t=1, 2, . . . , and a high-rate sequential arrival of IoV and smart city service requests can be assumed, one task at a time step. ECs can be intelligent to learn how to decide (which FN to serve or reject) for each service request, i.e., how to sequentially allocate limited edge resources, to achieve the objective of efficiently utilizing the edge resources while maximizing the grade-of-service (GoS) defined as the proportion of served high-utility requests to the total number of high-utility requests received.

An approach to deal with the network slicing problem can be to filter the received service requests by comparing their utility values with a predefined threshold. For instance, consider ten different utilities $u \in \{1, 2, 3, \ldots, 10\}$ for all received tasks in terms of the latency requirement, where u=10 represents the highest-priority and lowest-latency task such as the emergency requests from a driver distraction alerting system, and u=1 is for the lowest-priority task with highest level of latency, such as a service task from smart waste management system. Then, a non-adaptive solution for network slicing can be to dedicate the edge resources to high-utility tasks, such as $u \geq u_h$ and refer to the cloud the tasks with $u < u_h$, where the threshold un can be a predefined network design parameter. Such a policy may be sub-optimum since the EC can execute any task that satisfies the threshold regardless of how demanding the task load is. For instance, while FNs are busy with serving a few high-utility requests of high load, i.e., low-latency tasks that require large amount of resources c and long holding times h, many high-utility requests with low load demand may be missed. In addition, this policy can increase the burden on the cloud unnecessarily, especially when the environment is dominated by low-utility tasks with $u < u_h$. The disclosed technology, on the other hand, provides for a different slicing policy that can consider the current resource utilization and expected reward of each possible action while deciding, and also adapting to changing utility and load distributions in the environment. To this end, a Markov Decision Process (MDP) formulation can be used for the considered network slicing problem.

Figure 2:
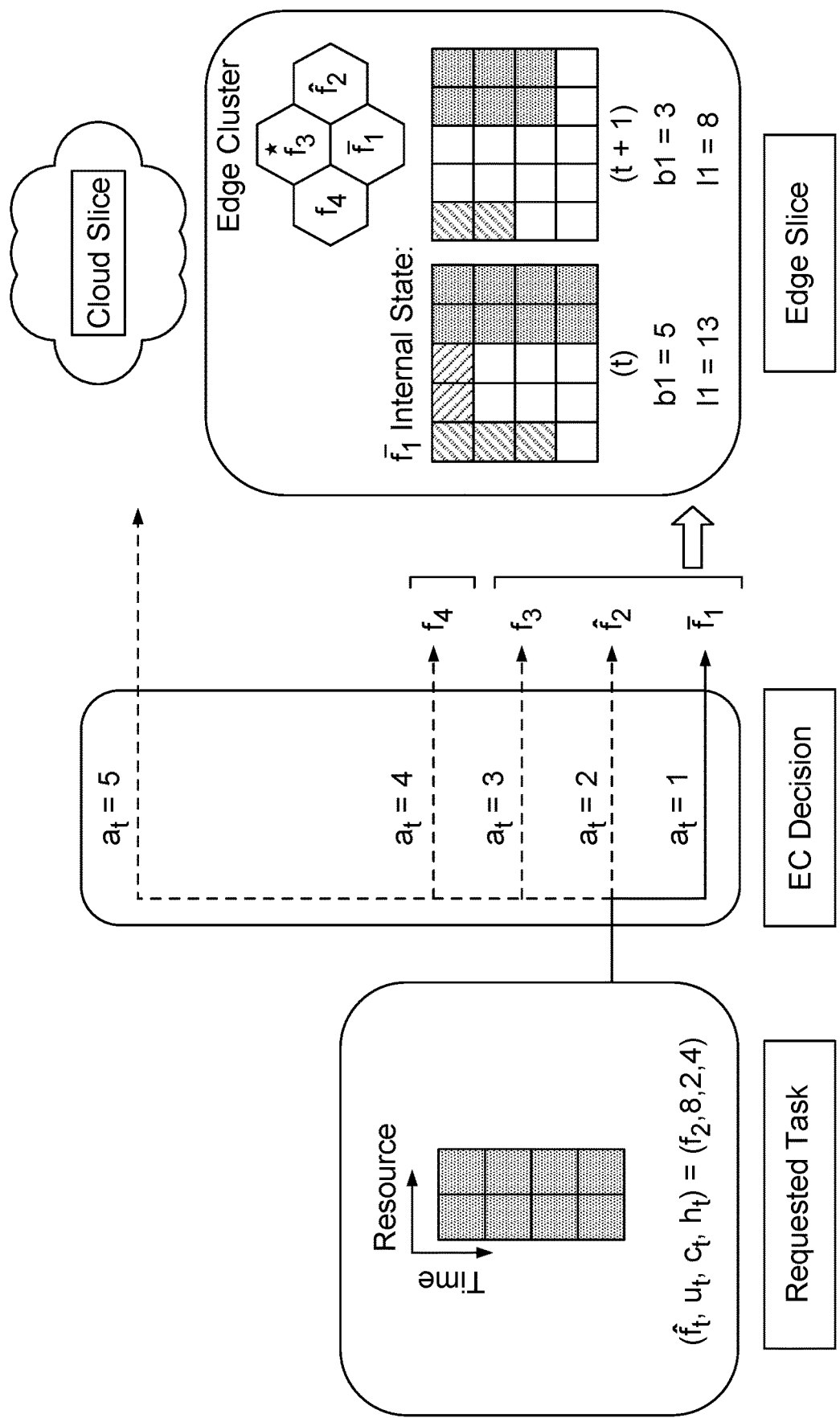
FIG. 2 is an edge controller's decision for a sample service request and an internal state of a serving fog node.

FIG. 2 is an edge controller's decision for a sample service request and an internal state of a serving fog node. In this example, an EC decision for a sample service request is received by $f_2$, and an internal state of the serving FN $f_1$ with N1=5 and $h_{max}$=4. The edge cluster size can be k=4 and $f_3$ is the EC. MDP formulation can enable the EC to consider expected rewards of possible actions in its network slicing decision. Since closed form expressions may not exist for the expected reward of each possible action at each system state in a real-world problem, reinforcement learning (RL) can be used to empirically learn optimum policy for the MDP formulation. The RL agent (the EC as described herein) can learn to maximize the expected reward by trial and error. That means the RL agent can sometimes exploit best known actions, and sometimes, especially in the beginning of learning, explore other actions to statistically strengthen its knowledge of best actions at different system states. Once the RL agent learns an optimum policy (i.e., the RL algorithm converges) through managing this exploitation-exploration trade-off, the learned policy can be exploited as long as the environment (i.e., the probability distribution of system state) remains the same. In dynamic IoV and smart city environments, an RL agent can adapt its decision policy to the changing distributions.

As illustrated in FIG. 2, for each service request in an edge cluster at time t from an IoV or smart city application with utility $u_t$, the primary FN can compute the number of resource blocks $c_t$ and the holding time $h_t$ that can be required to serve the task locally at the edge. Then, the primary FN can share ($u_t$, $c_t$, $h_t$) with the EC, which can keep track of available resources at all FNs in the cluster. If neither the primary FN nor its neighbors has $c_t$ available resource blocks for a duration of $h_t$, the EC can reject serving the task at the edge and refer it to the cloud. If the requested resource blocks $c_t$ for the requested duration $h_t$ are available at the primary FN or at least one of the neighbors, then the EC can use the RL algorithm described herein to decide either to serve or reject. As a result of the action taken $a_t$, the EC can observe a reward $r_t$ and the system state $s_t$ can transition to $s_{t+1}$.

Grade of Service (GoS) can be defined as a key performance indicator (KPI). GoS can be the proportion of a number of served high-utility service tasks to a total number of high-utility requests in the cluster, and given by:

$$GoS = \frac{m_h}{M_h} = \frac{\sum_{t=0}^{T-1} \mathbb{1}_{\{u_t \geq u_h\}} \mathbb{1}_{\{a_t \in (1,2,\ldots,k)\}}}{\sum_{t=0}^{T-1} \mathbb{1}_{\{u_t \geq u_h\}}}, \quad (1)$$

Where $u_h$ can be a utility threshold which differentiates the low-latency (i.e., high-utility) tasks such as URLLC from other tasks, and $\mathbb{1}_{\{\cdot\}}$ can be an indicator function taking the value 1 when its argument is true, and 0 otherwise.

The network operator may desire edge resources to be efficiently utilized. Hence, the operator can average utilization of edge resources over a time period T gives another KPI:

$$\text{Utilization} = \frac{1}{T}\sum_{t=0}^{T-1}\frac{\sum_{i=1}^{k} b_{it}}{\sum_{i=1}^{k} N_i}, \quad (2)$$

Where $b_{it}$ and $N_i$ can be a number of occupied resources at time t, and the resource capacity of the $i^{th}$ FN in the cluster, respectively. Another KPI to examine the EC performance can be cloud avoidance, which can be given by the proportion of all IoV and smart city service requests that are served by FNs in the edge cluster to all requests received. Cloud avoidance can be reported over a period of time T, and it can be given by:

$$\text{Cloud Avoidance} = \frac{m}{M} = \frac{\sum_{t=0}^{T-1} \mathbb{1}_{\{a_t \in (1,2,\ldots,k)\}}}{M}, \quad (3)$$

Where $m=m_h+m_l$ can be a number of high-utility and low-utility served requests at the edge cluster, and $M=M_h+M_l$ can be a total number of high-utility and low-utility received requests. Note that M−m can be a portion of IoV and smart city service tasks that can be served by the cloud, and one of the objectives of F-RAN can be to lessen this burden, especially during busy hours. Cloud avoidance can show a general overview about the contribution of edge slice to share the load. It can provide a similar metric as resource utilization, which can be more focused on resource occupancy rather than dealing with service requests in general. Cloud avoidance can still be used as a performance evaluation metric, as described further below.

To evaluate performance of an EC over a particular period of time T, a weighted sum of the main two KPIs, the GoS and edge-slice average resource utilization, can be:

Performance=$\omega_g$GoS+$\omega_u$Utilization. (4)

Moreover, an MDP can be defined by a tuple ( $\mathcal{S}$, $\mathcal{A}$, $P_a$, $R_a$, $\gamma$), where S is a set of states, i.e., $s_t \in \mathcal{S}$, $\mathcal{A}$ can be a set of actions, i.e., $a_t \in \mathcal{A} = \{1, 2, \ldots, k, k+1\}$. $P_a(s, s')$= $P(s_{t+1}=s'|s_t=s, a_t=a)$ can be a transition probability from state s to s' when action a is taken, $R_a(s, s')$ can be a reward received by taking action a in state s, which can end up in state s', i.e., $r_t \in R_a(s, s')$, and $\gamma \in [0, 1]$ can be a discount factor in computing the return, which can be the cumulative reward:

$$G_t = r_t + \gamma r_{t+1} + \gamma^2 r_{t+2} + \ldots = \sum_{j=0}^{\infty} \gamma^j r_{t+j} \quad (5)$$

Where $\gamma$ can represent how much weight can be given to the future rewards compared to the immediate reward. For $\gamma=1$, future rewards can be of equal importance as the immediate reward, whereas $\gamma=0$ can ignore future rewards. An objective in MDP can be to maximize an expected cumulative reward starting from t=0, i.e., $$\max_{\{a_t\}} \mathbb{E}[G_0|s_0],$$

where $G_t$ can be given by choosing the actions $\{a_t\}$.

Before explaining the state (state, action, reward) structure in the proposed MDP, a task load $L_t$ can be defined as a number of resource blocks required to execute a task:

$L=c \times h$, (6)

And similarly, the existing load $l_{it}$ of FN i as the number of already allocated resource blocks, as shown in FIG. 2.

The system state can be defined in a cluster of size k at any time t as:

$$s_t=(b_{1t},l_{1t},b_{2t},l_{2t},\ldots,b_{kt},l_{kt},\hat{f}_t,u_t,c_t,h_t), \quad (7)$$

Where $b_{it}$ can denote a number of resource blocks in use at FN i at time t. Note that $b_{i(t+1)}$, $l_{i(t+1)}$ and in turn the next state $s_{t+1}$ can be independent of the past values given the current state $s_t$, satisfying the Markov property $P(s_{t+1}|s_0, s_1, s_2, \ldots, s_t, a_t)=P(s_{t+1}|s_t, a_t)$.

With regards to action, the EC can decide, as shown in FIG. 2, for each service request by taking an action $a_t \in \mathcal{A}=\{1, 2, \ldots, k, k+1\}$, where $a_t=i\in\{1, 2, \ldots, k\}$ means serve the requested task at the $i^{th}$ FN in the cluster, $f_i \in \mathcal{C}=\{f_1, f_2, \ldots, f_k\}$, whereas $a_t=k+1$ means to reject the job and refer it to the cloud. Note that for a request received by $f_i$, the feasible action set can be a subset of $\mathcal{A}$ consisting of $f_i$, its neighbors $\mathcal{N}_{f_i}$, and the cloud. FIG. 2 illustrates the decision of the EC for a sample service request received by $f_2$ at time t in an edge cluster with k=4 FNs. Note that in this example, the action $a_t=4$ may not be feasible as $f_4 \notin \mathcal{N}_2$, and the EC took the action $a_t=1$, which means serve the task by $f_1$. Hence, $f_1$ started executing the task at t while another two tasks (striped yellow and green) are in progress. At t+1, two resource blocks can be released as the job in clear-green can be completed. Note that resource utilization of $f_1$ decreased from 100% at t, i.e., internal busy state with $b_{1t}=5$, to 60% at t+1.

With regards to reward, in general, a proper rewarding system can be crucial for an RL agent to lean an optimum policy of actions that can maximum the KPIs. The EC RL agent can collect an immediate reward $r_t \in R_a(s, s')$ for taking action a at time t from state s which ends in state s' in the next time step t+1. The immediate reward can be defined as:

$$r_t=r(a_t,u_t)\pm r_{L_t} \quad (8)$$

Using two components. The first term $r_{(a_t,u_t)} \in \{r_{sh}, r_{sl}, r_{rh}, r_{rl}, r_{bh}, r_{bl}\}$ can correspond to the reward portion for taking an action $a\in\{1, 2, \ldots, k, k+1\}$ when a request for specific u is received. The second term:

$$r_{L_t}=c_{max} \times h_{max}+1-L_t, \quad (9)$$

Can consider the reward portion for handling a new job load $L_t=c_t \times h_t$ of a requested task. For instance, serving low-load tasks such as L=3 can be awarded more than serving a task with L=18. Similarly, rejecting a low-load task such as L=3 can be more penalized, i.e., negatively rewarded, especially when $u \geq u_h$, than rejecting a task with the same utility and higher load such as L=18. The two reward parts can be added when $a_t$=serve, and subtracted if $a_t$=reject. Six different reward-component can be defined as $r_{(a,u)} \in \{r_{sh}, r_{sl}, r_{rh}, r_{rl}, r_{bh}, r_{bl}\}$, where $r_{sh}$ can be the reward for servicing a high-utility request, $r_{sl}$ can be the reward for serving a low-utility request, $r_{rh}$ can be the reward for rejecting a high-utility request, $r_{rl}$ can be the reward for rejecting a low-utility request, $r_{bh}$ can be the reward for rejecting a high-utility request due to being busy, and $r_{bl}$ can be the reward for rejecting a low-utility request due to being busy. Note that having a separate reward for rejecting due to a busy state can make it easier for the RL agent to differentiate between similar states for the reject action. A request can be determined as high-utility or low-utility based on the threshold $u_h$, which can be a design parameter that depends on the level of latency an IoV and smart city environment.

Figure 3:
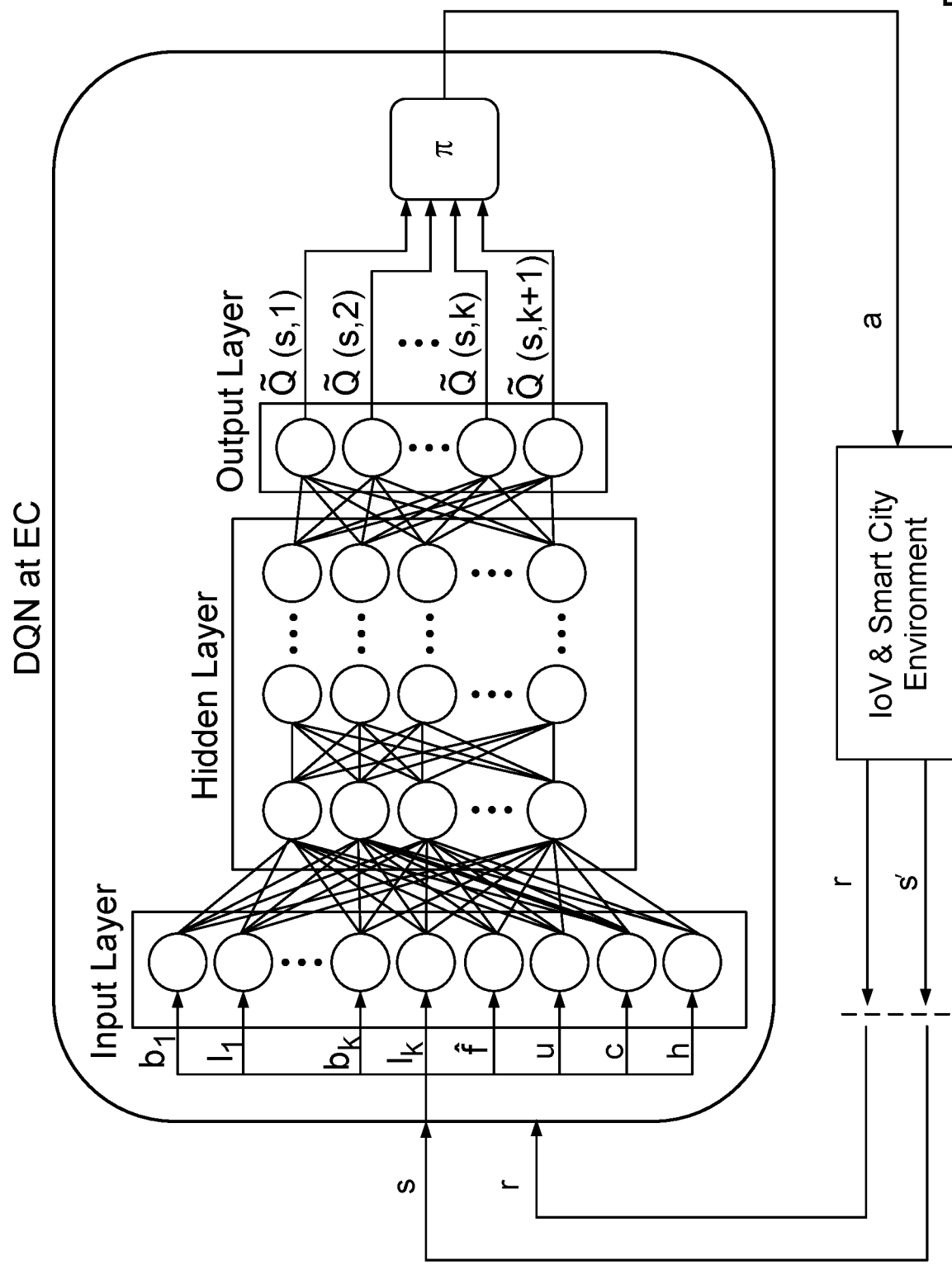
FIG. 3 depicts an interaction of a Deep Q-Network (DQN)-based edge controller with an intelligent vehicular system and smart city environment.

FIG. 3 depicts an interaction of a Deep Q-Network (DQN)-based edge controller with an intelligent vehicular system and smart city environment. Given an EC input state of $s=(b_1, l_1, \ldots, b_k, l_k, \hat{f}, u, c, h)$, the DQN agent can predict action-value functions and follow a policy $\pi$ to take an action a which ends up in state s', and collects a reward r accordingly.

State value function V (s) can represent the long-term value of being in a state s. That is, starting from state s, how much value on average the EC can collect in the future, i.e., the expected total discounted rewards from that state onward. Similarly, the action-value function Q(s, a) can tell how valuable it is to take a particular action a from the state s. It can represent the expected total reward which the EC may get after taking the particular action a from the state s onward. The state-value and the action-value functions are provided as:

$$V(s)=\mathbb{E}[G_t|s]=\mathbb{E}[r_t+\gamma V(s')|], \quad (10)$$

$$Q(s,a)=\mathbb{E}[G_t|s,a]=\mathbb{E}[r_t+\gamma Q(s',a')|s,a], \quad (11)$$

Where the state value V (s) and the action value Q(s, a) can be recursively presented in terms of the immediate reward $r_t$ and the discounted value of the successor state V ($s^t$) and the successor state-action Q($s^t$, $a^t$), respectively.

Starting at the initial state $s_0$, the EC objective can be achieved by maximizing the expected total return V ($s_0$)= $\mathbb{E}[G_0|s_0]$ over a particular time period T. To achieve this goal, the EC can learn an optimal decision policy to take proper actions. However, considering the large dimension of sate space and the intractable number of state-action combinations, it can be infeasible for RL tabular methods to keep track of all state-action pairs and continuously update the corresponding V (s) and Q(s, a) for all combinations in order to learn the optimal policy. Approximate DRL methods such as DQN can be a more efficient alternative for the high-dimensional EC MDP to quickly learn an optimal decision policy to take proper actions, as discussed below.

A policy $\pi$ can be a way of selecting actions. It can be viewed as a mapping from states to actions as it describes the set of probabilities for all possible actions to select from a given state, $\pi=\{P(a|s)\}$. A policy can help in estimating the value functions shown in equations (10) and (11). $\pi_1$ can be better than another policy $\pi_2$ if the state value function following $\pi_1$ is greater than that following $\pi_2$ for all states, i.e., $\pi_1 > \pi_2$ if $V_{\pi 1}(s) > V_{\pi 2}(s)$, $\forall_s \in \mathcal{S}$. A policy $\pi$ can be optimal if it maximizes the value of all states, i.e., $\pi^*$=arg max $V_\pi(s)$, $\forall_s \in S$. Hence, to solve the considered MDP problem, the DRL agent can find the optimal policy through finding the optimal state-value function $$V^*(s) = \max_\pi V_\pi(s),$$

which can be similar to finding the optimal action-value function $$Q^*(s, a) = \max_\pi Q_\pi(s, a)$$

for all state-action pairs. From equations (10) and (11), the Bellman optimality equations can be written for V*(s) and Q*(s, a) as:

$$V^*(s) = \max_{a \in \mathcal{A}} Q^*(s, a) = \max_{a \in \mathcal{A}} \mathbb{E}[r_t + \gamma V^*(s')|s, a], \quad (12)$$

$$Q^*(s, a) = \mathbb{E}\left[r_t + \gamma \max_{a' \in \mathcal{A}} Q^*(s', a')|s, a\right]. \quad (13)$$

The expression of optimal state-value function V*(s) can simplify the search for optimal policy as it subdivides the targeted optimal policy into local actions: take an optimal action a* from state s which can maximize the expected immediate reward followed by the optimal policy from successor state s'. Hence, the optimal policy can be taking the best local actions from each state considering the expected rewards. Dealing with Q*(s, a) to choose optimal actions can be simpler since with Q*(s, a) there may be no need for the EC to do one-step-ahead search. Instead, the EC can pick the best action that maximizes Q*(s, a) at each state. The optimal action for each state s can be given by:

$$a^* = \arg\max_{a \in \mathcal{A}} Q^*(s, a) = \arg\max_{a \in \mathcal{A}} \mathbb{E}[r_t + \gamma V^*(s')|s, a]. \quad (14)$$

The optimal policy can be learned by solving the Bellman optimality equations (12) and (13) for a*. This can be done for tractable number of states by estimating the optimal value functions using tabular solution methods such as dynamic programming, and model-free RL methods which can include Monte Carlo, SARSA, expected SARSA, and Q-Learning (QL). For high-dimensional state space, such as that given in equation (7), tabular methods may not be tractable in terms of computational and storage complexity. Deep RL (DRL) methods can address the high-dimensionality problem by approximating the value functions using deep neural networks (DNN).

Deep Q-Network (DQN) can be a powerful DRL method for addressing RL problems with high-dimensional input states and output actions. DQN can extend QL to high-dimensional problems by using DNN to approximate the action-value functions without keeping a Q-table to store and update the Q-values for all possible state-action pairs as in QL. FIG. 3 demonstrates the DQN method for EC in the network slicing problem, in which the DQN agent at EC can learn about the IoV and smart city environment by interaction. The DQN agent can be a DNN that consists of an input layer, hidden layers, and an output layer. The number of neurons in the input and output layers can be equal to the state and action dimensions, respectively, whereas the number of hidden layers and the number of neurons in each hidden layer can be design parameters to be chosen. Feeding the current EC state s to the DNN as an input and regularly updating its parameters, i.e., the weights of all connections between neurons, DNN can predict the Q-values at the output for a given input state. The DRL agent at EC sometimes can take random actions to explore new rewards, and at other times can exploit its experience to maximize the discounted cumulative rewards over time and keep updating the DNN weights. Once the DNN weights converge to the optimal values, the agent can learn the optimal policy for taking actions in the observed environment.

For a received service request, if the requested resources are affordable, i.e., $c_i \leq (N_i - b_{it})$ for any $f_i \in \{\tilde{f}_i, \mathcal{N}_i\}$, the EC can make a decision whether to serve the request by the primary FN or one of its neighbors, or reject and refer it to the cloud. From equation 14, the optimal action at state s can be given by, $$a^* = \begin{cases} i \in \tilde{\mathcal{A}} \text{ if } Q^*(s, i) = \max_{a \in \{\tilde{\mathcal{A}}, k+1\}} Q(s, a), \\ k+1 \text{ othewise,} \end{cases} \quad (15)$$

Where $\tilde{\mathcal{A}}$ can denote the set of possible serve actions to execute the service task by $f_i \in \{\tilde{f}_i, \mathcal{N}_i\}$. The procedure to learn the optimal policy from the IoV and smart city environment using the model-free DQN algorithm can be given in Algorithm 1, as depicted in FIG. 4.

FIG. 4 illustrates a deep reinforcement learning (DRL) algorithm for how the edge controller can learn an optimal policy for a considered Markov decision process (MDP). Algorithm 1 shows how the EC learns the optimal policy π* for the considered MDP. It can require the EC design parameters k, $\mathcal{N}_i$, N, and $u_h$, and selecting the DNN hyper parameters γ, the target update rate ρ, the probability ∈ of making a random action for exploration, the replay memory capacity D to store the observations (s, a, r, s'), the minibatch size n of samples used to train the DNN model and update its weights w, and the data of the IoV and smart city users u, c, h. Note that u, c and h can be real data from the IoV and smart city environment, as well as from simulations if the probability distributions are known. The DNN target model at line 2 can be used to stabilize the DNN model by reducing the correlation between the action-values Q(s, a) and the targets $$r + \gamma \max_{a'} Q(s', a')$$

through only periodical updates of the target model weights w^. In each iteration, an action can be taken to observe the collected reward and the successor state. Actions can be taken according to a policy π such as the ∈-greedy policy in which a random action with probability ∈ can be taken to explore new rewards, and an optimal action (see equation (15)) can be taken with probability (1−∈) to maximize the rewards. The model can be trained using experience replay as shown in lines 9-14. At line 9, a minibatch of n random observations can be sampled from M. The randomness in selecting samples can eliminate correlations in the observations to avoid model overfitting. At line 11, output vector Q^ of the target model can be estimated for a given input state s in each experience sample using the target model weights w^. Q⁻ and Q^ can be the predicted vectors of the k+1 Q-values for a given state s with respect to w and w^, respectively. The way to update the action-value for sample j is shown at line 12, where the element value Q^$_j$[a$_j$] can be replaced with the immediate reward r$_j$ if state is terminal, i.e., t=T 1, or with the collected immediate reward and a discounted value of the maximum action-value considering all possible actions which can be taken from the state at t+1 if t<T 1. At line 13, the model weights w can be updated by fitting the model for the input states and the updated predicted outputs. A gradient decent step can be applied to minimize the squared loss $(\hat{Q}_j - \tilde{Q}_j)^2$ between the target and the model predictions. The target model weights can be periodically updated every τ time steps as shown at line 16, where the update rate ρ can exemplify how much. The algorithm can end when the DNN model weights w converge. The converged values can then be used to determine optimal actions, i.e., π* as in equation (15).

Next, simulation results can be provided to evaluate the performance of the proposed network slicing approach in dynamic IoV and smart city environments. The DRL algorithm given in Algorithm 1 in FIG. 4 can be compared with the serve-all-utilities (SAU) algorithm in which the EC serves all coming tasks when requested resources are available, serve-high-utilities (SHU) algorithm where the EC filters high-utility requests and serve them if the available resources are enough, and the QL algorithm independently running at each FN following a local version of our MDP formulation. The QL algorithm at each FN can correspond to the non-cooperative scenario, hence this comparison can help evaluate the importance of cooperation among FNs. In the non-cooperative scenario, each FN can operate as a standalone entity with no neighbors to handover tasks when busy, and no EC to manage the edge resources.

Performances can be evaluated in various IoV and smart city environments with different compositions of user utilities. Specifically, 10 utility classes can be considered that represent different latency requirements to exemplify the variety of IoV and smart city applications in an F-RAN setting. By changing the distribution of utility classes, 5 IoV and smart city environments can be generalized, as summarized in Table I. Higher density of high-utility applications can make the IoV and smart city environment richer in terms of URLLC applications.

Denoting an IoV and smart city environment of a particular utility distribution with E, in Table I, statistics of $E_1$, $E_2$, $E_3$, $E_4$, and $E_5$ are shown. The probabilities in the first 10 rows in Table I present information about the proportion of each utility class in the environment corresponding to the latency requirement of diverse IoV and smart city applications. The last two rows interpret the quality or richness of IoV and smart city environments, where $\bar{u}$ can be a mean of utilities in an environment, and $P(u \geq u_h)$ can be the percentage of high-utility population.

Table I illustrates utility distributions corresponding to a variety of latency requirements of IoV and smart city applications in various environments.

|  | $\varepsilon_1$ | $\varepsilon_2$ | $\varepsilon_3$ | $\varepsilon_4$ | $\varepsilon_5$ |
|---|---|---|---|---|---|
| P(u = 1) | 0.015 | 0.012 | 0.008 | 0.004 | 0.001 |
| P(u = 2) | 0.073 | 0.058 | 0.038 | 0.019 | 0.004 |
| P(u = 3) | 0.365 | 0.288 | 0.192 | 0.096 | 0.019 |
| P(u = 4) | 0.292 | 0.230 | 0.154 | 0.077 | 0.015 |
| P(u = 5) | 0.205 | 0.162 | 0.108 | 0.054 | 0.011 |
| P(u = 6) | 0.014 | 0.071 | 0.142 | 0.214 | 0.271 |
| P(u = 7) | 0.013 | 0.064 | 0.129 | 0.193 | 0.244 |
| P(u = 8) | 0.011 | 0.057 | 0.114 | 0.171 | 0.217 |
| P(u = 9) | 0.009 | 0.043 | 0.088 | 0.129 | 0.163 |
| P(u = 10) | 0.003 | 0.015 | 0.029 | 0.043 | 0.085 |
| $P(u \geq u_h = 8)$ | 2.3% | 11.5% | 22.9% | 34.3% | 43.5% |
| $\bar{u}$ | 3.82 | 4.589 | 5.56 | 6.5 | 7.27 |

Simulations can begin with a general environment given by $E_3$ for the following IoV and smart city applications corresponding to the utility values 1, 2, . . . , 10, respectively: smart lighting and automation of public buildings, air quality management and noise monitoring, smart waste management and energy consumption management, smart parking assistance, in-vehicle audio and video infotainment, driver authentication service, structural health monitoring, safe share rides, smart amber alerting system and AI-driven and video-analytics tracking services, and driver distraction alerting system and autonomous driving. Then, the utility distribution can be changed to obtain the other environments.

Figure 5:
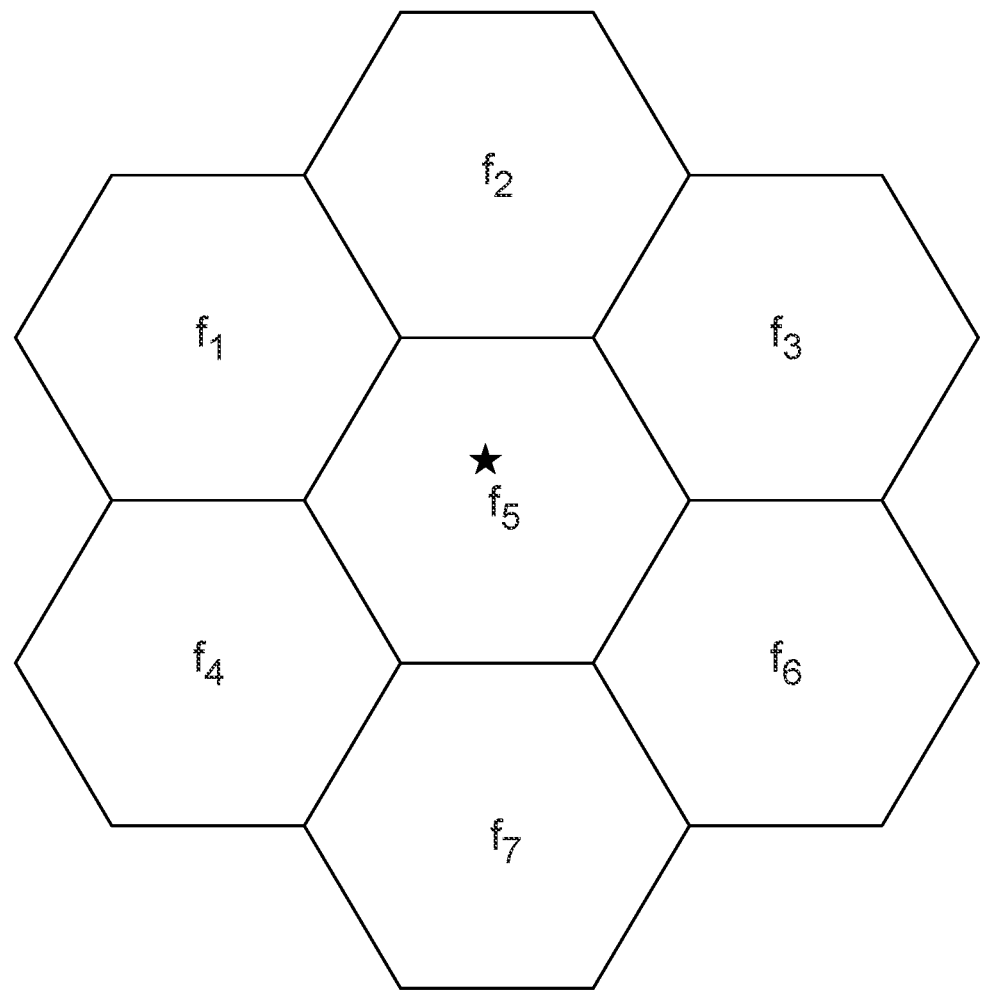
FIG. 5 illustrates a structure of an edge cluster considered in the disclosed simulations.

The simulation parameters used are summarized in Table II. An edge cluster can be considered of size k=7, where each FN has a computing and processing resource capacity of seven resource blocks, i.e., N=7. The central FN $f_5$ can act as the EC, and the neighboring relationships are shown in FIG. 5. FIG. 5 illustrates a structure of an edge cluster considered in the disclosed simulations. The neighboring lists can include only adjacent FNs.

TABLE II

Simulation Setup

| Parameter | Description | Value |
|---|---|---|
| N | FN resource capacity | 7 |
| C | set of possible resource blocks | {1, 2, 3, 4} |
| H | set of possible holding times | 5 × {1, 2, 3, 4, 5, 6} |
| $\omega_g$ | weight for GoS | {0.7, 0.5, 0.3} |
| $\omega_u$ | weight for resource utilization | {0.3, 0.5, 0.7} |
| $u_h$ | threshold for a "high-utility" | 8 |
| D | capacity of DNN replay memory | 2000 |
| γ | reward discount factor | 0.9 |
| α | learning rate | 0.01 |
| ϵ | probability of random action | 1.0 with 0.9995 decay |
| n | batch size | 32 |
| τ | $\hat{w}$ update Interval | 1000 |
| ρ | $\hat{w}$ update rate | 0.2 |

In a particular IoV and smart city environment, the threshold that defines "high utility" can be set to $u_h$=8, i.e., u∈{8, 9, 10} can be a high-utility application with higher priority for edge service. To make the resource allocation of the network slicing problem more challenging, a request arrival rate of at least five times the task execution rate can be considered, i.e., holding times increment by five times the arrival interval. The probabilities of c∈C={1, 2, 3, 4} can be 0.1, 0.2, 0.3, and 0.4, respectively, whereas the probabilities of h∈H={5, 10, 15, 20, 25, 30} can be 0.05, 0.1, 0.1, 0.15, 0.2, and 0.4, respectively.

A fully connected DNN structure can be considered for DQN with an input layer of 18 neurons, 2 hidden layers of 64 and 24 neurons, respectively, and an 8-neuron output layer. Linear activation function can be used at the output layer and ReLU activation can be considered for the other layers. The Huber loss function and the RMSprop optimizer can be considered with 0.01 learning rate, $10^{-4}$ learning decay, and momentum of 0.9. The ∈-greedy policy can be adopted in DNN training where ∈ starts at 1.0 for 10% of the time in training and then decays at a rate of 0.9995 to a minimum value of $10^{-3}$ to guarantee enough exploration over time.

The KPIs described herein can also be examined (e.g., GoS, resource utilization, cloud avoidance, as well as the overall performance (see equations (4)-(3))), considering the three scenarios shown in Table III with the weights $\omega_g$=1 $\omega_u$=0.7, $\omega_g$=$\omega_u$=0.5, and $\omega_g$=1 $\omega_u$=0.3. Each scenario in Table III can represent a new problem, hence the rewarding systems $R_1$, $R_2$, and $R_3$ can be chosen to facilitate learning the optimal policy in each scenario. The two reward components, $r_{(a,u)}$ $r_{sh}$, $r_{rh}$, $r_{bh}$, $r_{sl}$, $r_{rl}$, $r_{bl}$ and $r_L$ for each rewarding system can be provided in Table III. Note that unlike $R_2$ and $R_3$, $R_1$ can encourage rejecting low-utility requests with higher loads to accommodate the performance requirement of scenario 1, which can put higher weight on GoS with $\omega_g$=0.7. On the other hand, $R_3$ can promote serving regardless of the request utility and the task load as the performance in scenario 3 can be in favor of achieving higher resource utilization with $\omega_u$=0.7.

TABLE III

Considered Rewarding Systems

| Scenario | $\omega_g$ | $\omega_u$ | R | $\{r_{sh}, r_{rh}, r_{bh}, r_{sl}, r_{rl}, r_{bl}\}$ | $r_L$ |
|---|---|---|---|---|---|
| 1 | 0.7 | 0.3 | $R_1$ | {24, −12, −12, −3, 3, 12} | (see [9]) |
| 2 | 0.5 | 0.5 | $R_2$ | {24, −12, −12, 0, 0, 12} | (see [9]) |
| 3 | 0.3 | 0.7 | $R_3$ | {50, −50, −50, 50, −50, −25} | 0 |

Figure 6:
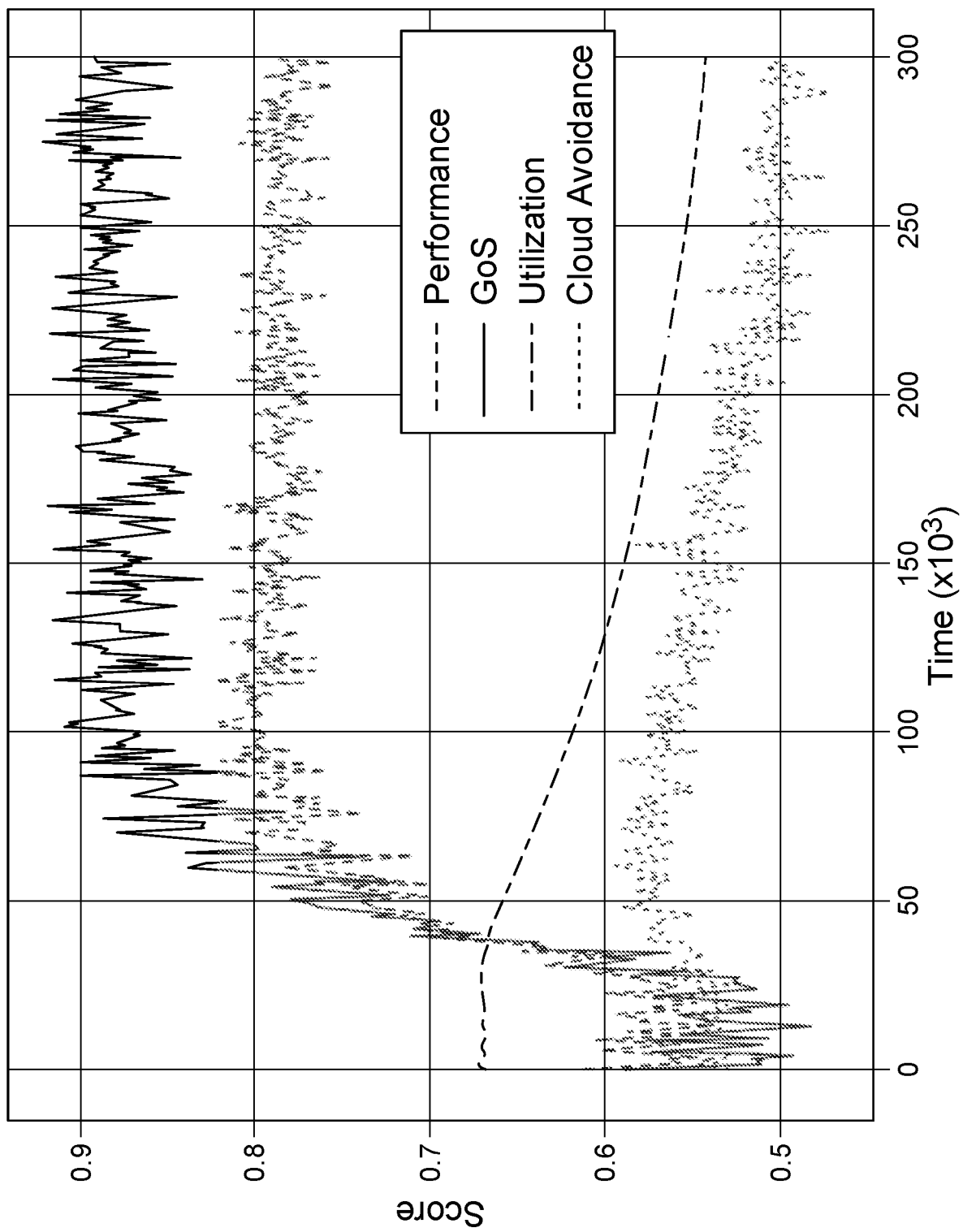
FIG. 6 is a graph depicting example performance and main network KPIs for DQN-based edge controller while learning an optimum policy in the IoV and smart city environment.

FIG. 6 is a graph depicting example performance and main network KPIs for DQN-based edge controller while learning an optimum policy in the IoV and smart city environment. Environment $E_3$ shown in Table I and the scenario 1 in Table III is shown in FIG. 6. By interaction with the environment as illustrated in FIG. 3, the EC can learn the optimal policy using the DQN method given in Algorithm 1 shown in FIG. 4. FIG. 6 shows the learning curve for the proposed DQN-based EC in terms of the overall performance and KPIs that converge to the optimal scores. Starting with random actions for 30 k time steps, the EC initially can put more weight on utilizing its resources and hence many high-utility requests can be missed. However, as exploration rate decays, the EC can align with the objectives of scenario 1, putting more emphasis on GoS by prioritizing high-utility users for edge service. The converged score of cloud-avoidance KPI can show that edge slice serves the 50% of the total received tasks.

Figure 7:
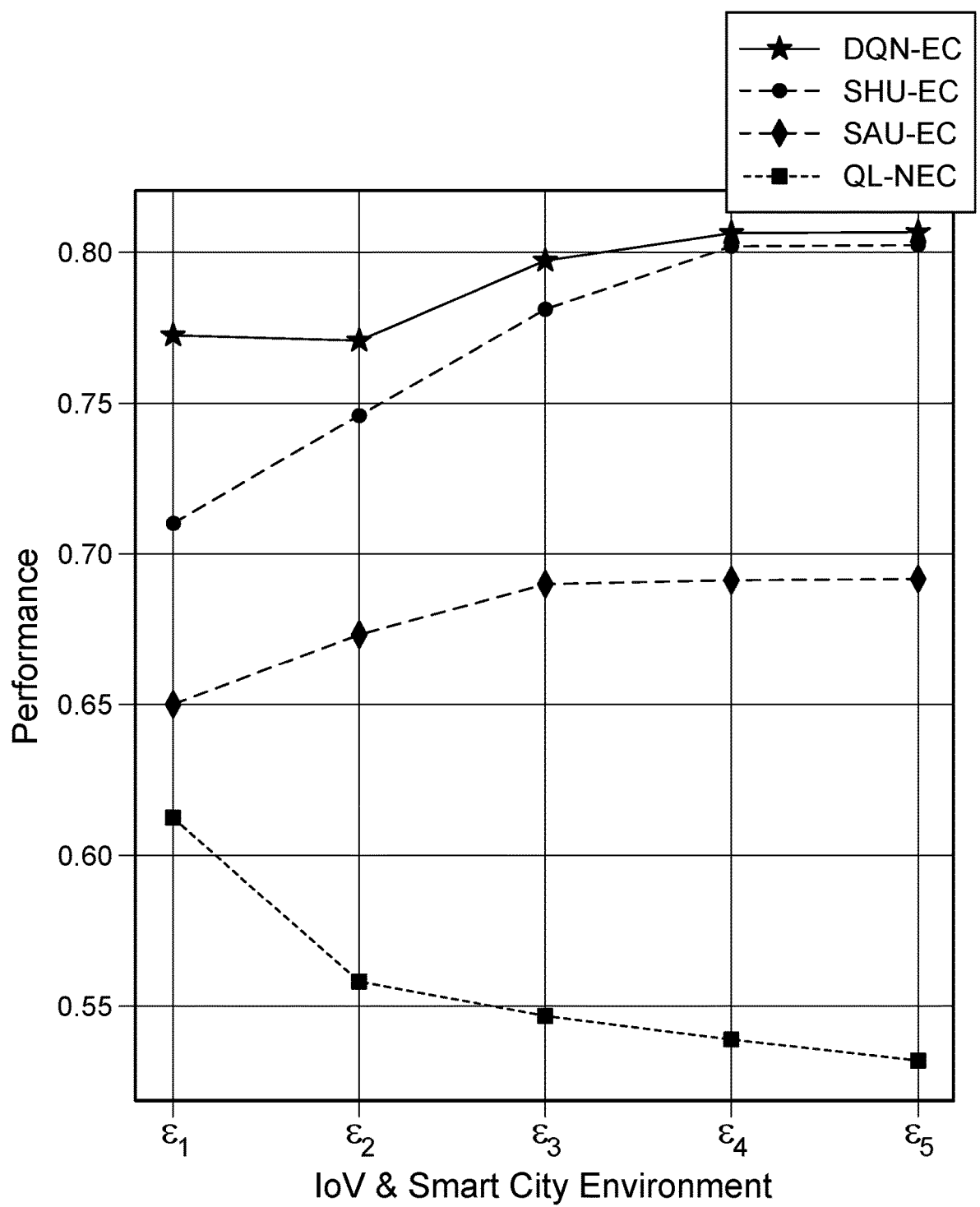
FIG. 7 is a graph depicting example performance of an edge slice when the edge controller applies the DRL algorithm of FIG. 4 in a first scenario.
Figure 8:
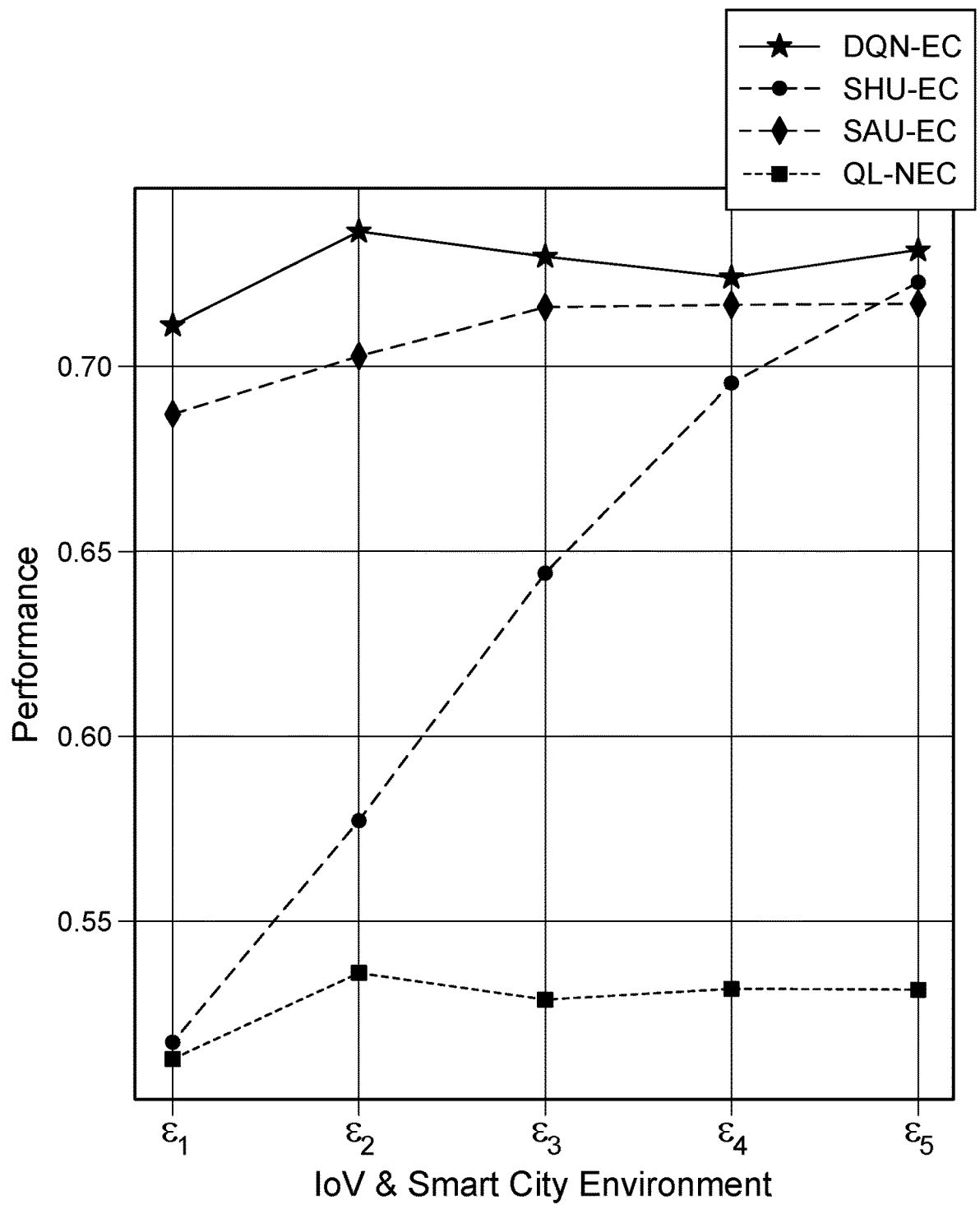
FIG. 8 is a graph depicting example performance of the edge slice when the edge controller applies the DRL algorithm of FIG. 4 in a second scenario.
Figure 9:
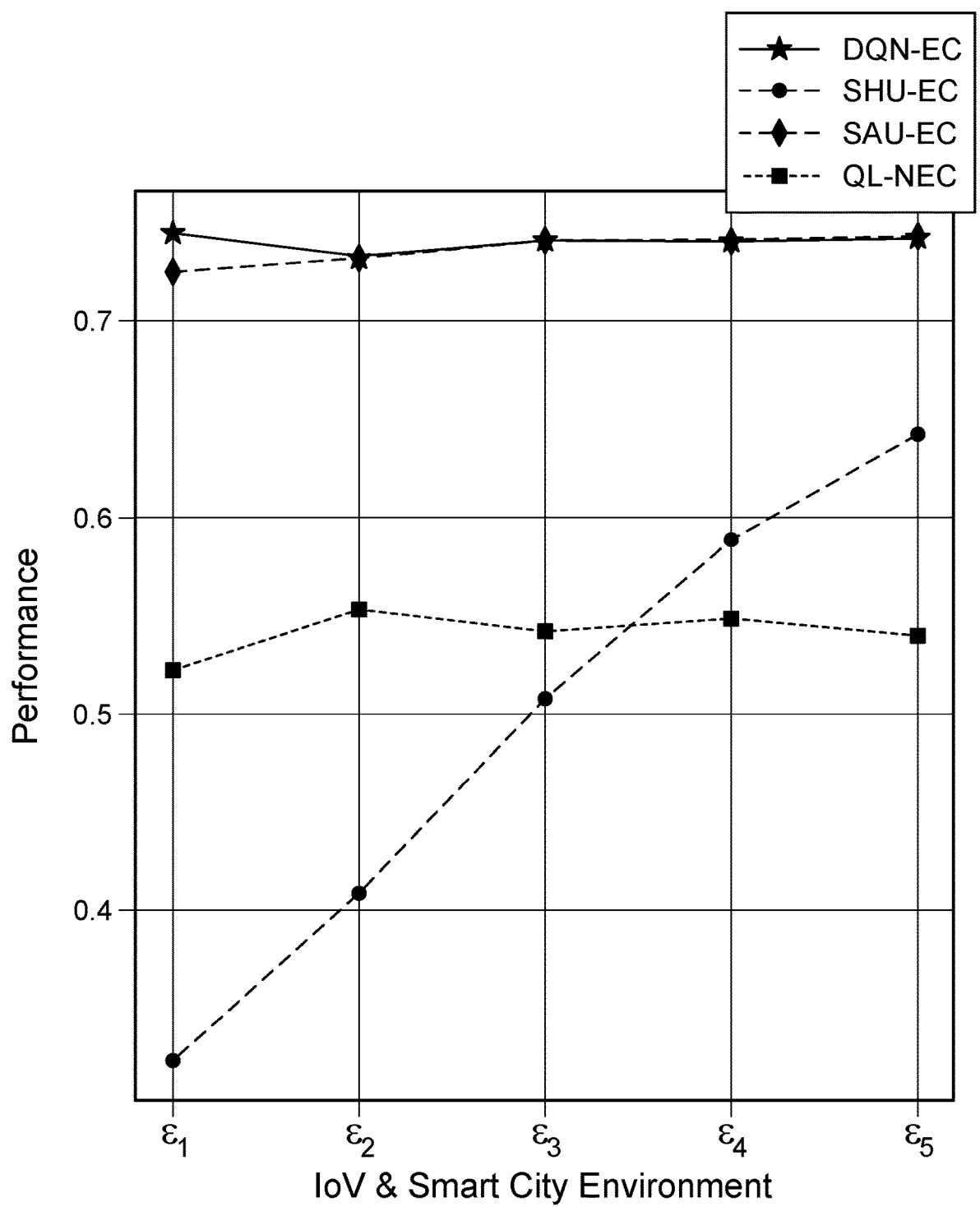
FIG. 9 is a graph depicting example performance of the edge slice when the edge controller applies the DRL algorithm of FIG. 4 to a third scenario.

Next, DQN-EC given in Algorithm 1 with SAU-EC, SHU-EC, and QL with no EC (QL-NEC) under the three scenarios given in Table III can be compared. FIGS. 7-9 show that the DRL-based EC can adapt to each scenario and outperform the other algorithms in IoV and smart city environments. FIG. 7 is a graph depicting example performance of an edge slice when the edge controller applies the DRL algorithm of FIG. 4 in a first scenario. For scenario 1 in FIG. 7, SHU-EC has a comparable performance to DQN-EC because SHU algorithm can promote serving high-utility requests all the time, which can match with the focus on GoS in scenario 1 design objective with $\omega_g$=0.7. However, in poor IoV and smart city environments with less high-utility population such as $E_1$ the performance gap can increase. This gap can shrink as environments becomes richer and SHU-EC achieves a performance as high as the DQN-EC score in $E_4$ and $E_5$. The performance of SAU-EC slightly increases while moving from $E_1$ to $E_3$ and becomes stable afterwards even for the richer environments $E_4$ and $E_5$ since SAU-EC may not prioritize high-utility tasks. Unlike the other algorithms, QL-NEC shows a declining trend since the network slicing problem can become more challenging with uncoordinated FNs while moving towards richer environments in this scenario.

FIG. 8 is a graph depicting example performance of the edge slice when the edge controller applies the DRL algorithm of FIG. 4 in a second scenario. FIG. 8 represents scenario 2 with equal weights for GoS and resource utilization, where SAU-EC is the second performing algorithm following DQN-EC. With less importance for GoS, the performance of SHU-EC can be as low as the QL-NEC in $E_1$ and although it grows while moving to richer environments, it does not reach a comparable level until $E_4$ and $E_5$. The uncoordinated FNs with QL-NEC can be more steady in scenario 2.

FIG. 9 is a graph depicting example performance of the edge slice when the edge controller applies the DRL algorithm of FIG. 4 to a third scenario. FIG. 9 shows the performances in scenario 3 in which more emphasis is put on resource utilization than GoS with $\omega_u$=0.7. It can be observed that SHU-EC can fail to achieve a comparable level of performance compared to DQN-EC while SAU-EC does.

FIGS. 10A-H are graphs depicting scores of three individual KPIs, GoS, resource utilization, and cloud avoidance when the edge controller applies the proposed DRL algorithm of FIG. 4 and different baseline algorithms described herein in three scenarios. FIGS. 10A-C depict scores when the edge controller applies the DRL algorithm of FIG. 4. DQN-EC can adapt to the design objective and the IoV and smart city environment. It can maximize GoS in scenario 1 as shown in FIG. 10A, balance GoS and utilization for scenario 2 as observed in FIG. 10B, and promote resource utilization for scenario 3 as shown in FIG. 10C. FIGS. 10D-H depict scores when the edge controller applies other baseline algorithms. The other baseline algorithms can include SAU, SHU, and QL. QL-NEC in FIGS. 10F-H can try to behave similarly as it learns by interaction, but the uncoordinated FNs in the edge slice cannot achieve that. Note that, DQN-EC can learn the right balance between GoS and resource utilization in each scenario. For instance, even though SHU-EC can be the second performing in FIG. 7 following DQN-EC, it can have lower utilization and cloud avoidance scores, i.e., less edge-slice contribution to handle service requests as shown in FIG. 10E. Similarly, SAU-EC can be well-performing in scenario 2 compared to DQN-EC as shown in FIG. 8, however, it may not learn to balance GoS and utilization as DQN-EC does in FIG. 10B.

Figure 11:
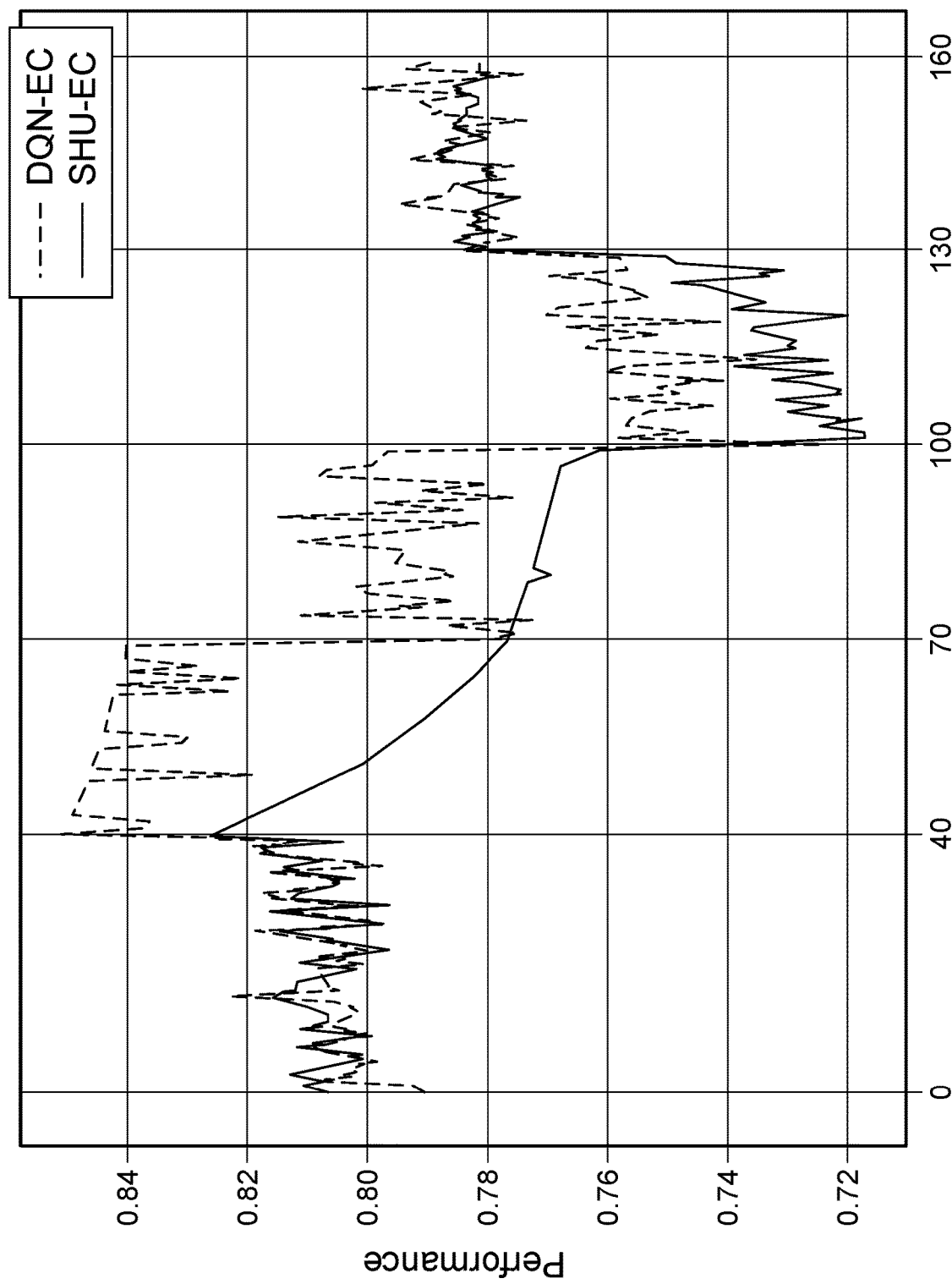
FIG. 11 is a graph depicting example performance of the proposed DQN and straightforward SHU policy for network slicing in a dynamic IoV and smart city environment.

FIG. 11 is a graph depicting example performance of the proposed DQN and straightforward SHU policy for network slicing in a dynamic IoV and smart city environment. Performance of the proposed DQN algorithm can be tested in a dynamic IoV and smart city environment. In FIG. 11, the design objectives of scenario 1 in Table III and a sampling rate of $5 \times 10^{-4}$ can be considered. To generate a dynamic IoT environment, the initial environment can have 40 samples and then change E every 30 samples. More samples can be considered for the initial E since the simulation can be started with vacant resource blocks for all FNs in the edge slice. A dynamic IoV and smart city environment can be considered whose composition of high-utility requests, i.e., low-latency tasks, changes over a day. Starting in the morning busy hours with $E_4$, the density of high-utility requests can drop over time to $E_1$ at the late morning hours after which it starts growing to reach $E_2$ by noon and $E_3$ in the evening, and then peaks again towards night busy hours with $E_5$. These 5 environments can represent different distributions for a diverse levels of utilities, i.e., different latency requirements of the various IoV and smart city aforementioned applications, hence they can be thought as different traffic profiles and busy hours in terms of the required QoS in IoV and smart city. These busy hours can directly affect the overall distribution of the environment over time and make it dynamic. In the proposed algorithm, once the EC detects the traffic profile, i.e., the environment, it can apply the corresponding optimal policy $\pi_4^*$ given in equation (15) to maximize the expected rewards in $E_4$. Right after the density of low-latency tasks drops over time to $E_1$, i.e., at t=80 k, the EC can keep following $\pi_4^*$ until it detects the change from the statistics of task utilities, which can result in a slight degradation in its performance since $\pi_4^* \pi^*$ may no longer be optimal for the new environment E. After a short learning period, the EC can adapt to the dynamics, and switch to the new optimal policy $\pi_1^*$. Similarly, as seen for the other transitions from E1 to E2, E2 to E3, and E3 to E5, DQN-EC can adapt to the changing IoV and smart city environments. Whereas the straightforward SHU-EX policy may perform well only in rich environments for which it was designed and cannot adapt to changes in the environment.

The disclosure provides for an infinite-horizon Markov decision process (MDP) formulation for the network slicing problem in a realistic fog-RAN with cooperative fog nodes. A deep reinforcement learning (DRL) solution for the edge controllers (ECs) can be used, which are the fog nodes that serve as cluster heads, to learn the optimal policy of allocating the limited edge computing and processing resources to vehicular and smart city applications with heterogeneous latency needs and various task loads. The deep Q-Network (DQN) based EC can quickly learn the dynamics through interaction with the environment and adapt to it. DQN-EC can dominate straightforward and non-cooperative RL approaches as it can continuously learn a balance between GoS and resource utilization under different performance objectives and environments. In a dynamic environment with changing distributions, DQN-EC can adapt to the dynamics and update its optimal policy to maximize performance.

Figure 12:
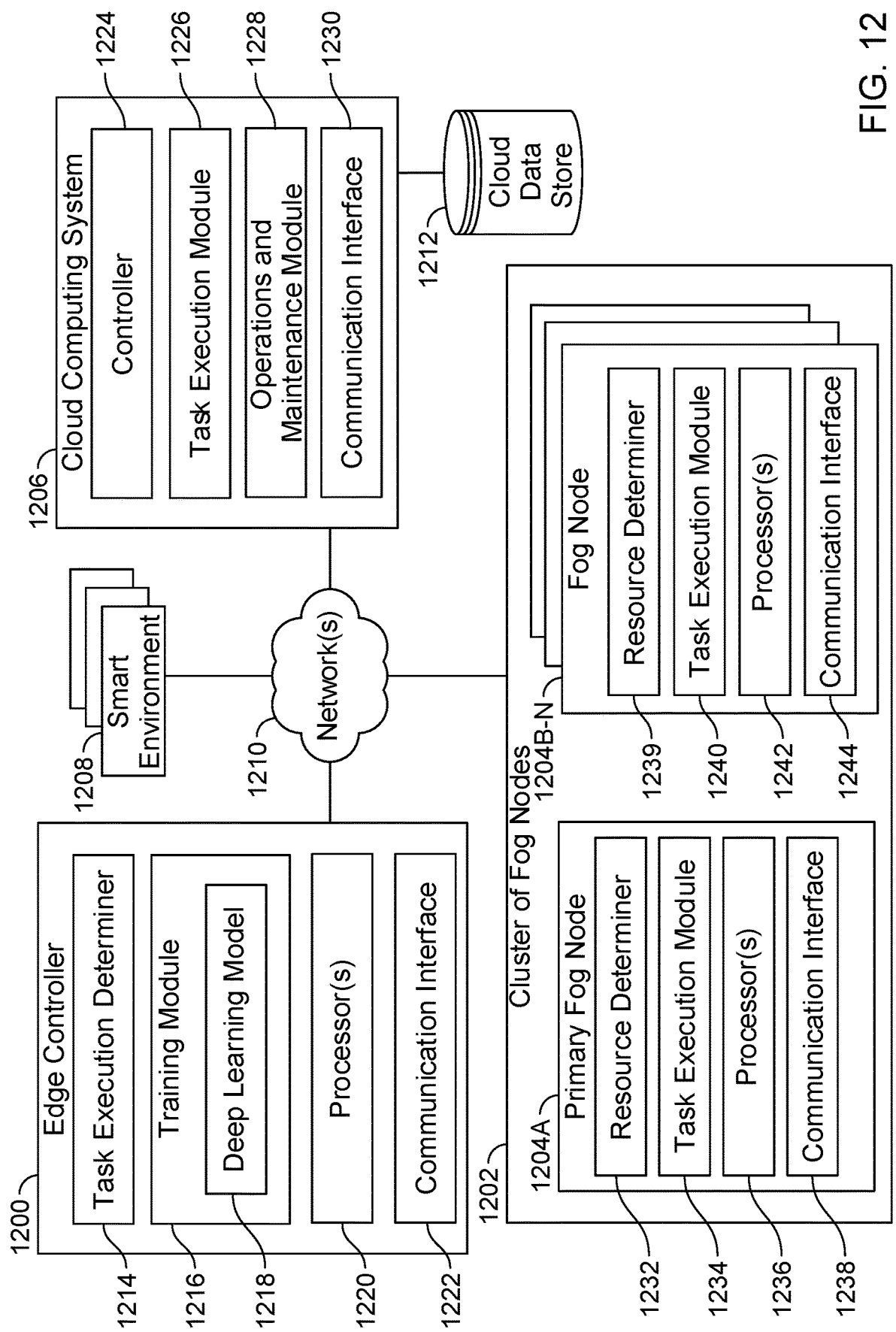
FIG. 12 is a system diagram of components used with the disclosed technology.

FIG. 12 is a system diagram of components used with the disclosed technology. An edge controller 1200, cluster of fog nodes 1202, cloud computing system 1206, and smart environment 1208 can be in communication (e.g., wired and/or wireless) via network(s) 1210.

The edge controller 1200 can be configured to determine whether service requests are executed in an edge slice (e.g., refer to FIG. 1) or a cloud slice, as described herein. The edge controller 1200 can receive a request to perform services from devices in the smart environment(s) 1208. The edge controller 1200 can include a task execution determiner 1214, a training module 1216, processor(s) 1220, and a communication interface 1222. The task execution determiner 1214 can determine, for example, whether service requests are capable of being completed on the edge slice, at one of the fog nodes in the cluster of fog nodes 1202, or whether the service requests should be completed at the cloud computing system 1206 at the cloud slice. The training module 1216 can be configured to learn an optimal policy for a considered Markov decision process (MDP), as described in reference to FIG. 4. Moreover, the module 1216 can include a deep learning model 1218, as described above, which can be used by the training module 1216 in learning the optimal policy for the considered MDP. The processor(s) 1220 can be configured to provide for the edge controller 1200 to perform and execute one or more of the operations described herein.

The cloud computing system 1206 can be configured to perform operations, such as executing a service request that is referred to the system 1206 by the edge controller 1200. The cloud computing system 1206 can include a controller 1224, a task execution module 1226, an operations and maintenance module 1228, and a communication interface 1230. The controller 1224 can be configured to control operations of the cloud computing system 1206, as described in reference to FIG. 1. The task execution module 1226 can be configured to perform service requests that are referred to the cloud computing system 1206 for execution therein. The operations and maintenance module 1228 can be configured to monitor key performance indicators (KPIs) and generate network reports. The cloud computing system 1206 can also be in communication with a cloud data store 1212, which can store information about the network, KPIs, and executed service requests.

The cluster of fog nodes 1202 can include a primary fog node 1204A as well as a plurality of fog nodes 1204B-N (e.g., refer to FIG. 1). The primary fog node 1204A can include a resource determiner 1232, a task execution module 1234, processor(s) 1236, and a communication interface 1238. The primary fog node assignment dynamically changes for each received service request. The primary fog node 1204A is a title given to one of the fog nodes 1204B-N that receives the service request under consideration for a decision. For example, the user device can transmit the service request to the fog node 1204B-N that the user device has best communication quality with (e.g., the fog node 1204B-N closest to the user device). The fog node 1204B-N that receives the service request therefore becomes the primary fog node 1204A.

The fog nodes 1204B-N can include a resource determiner 1239, task execution module 1240, processor(s) 1242, and a communication interface 1244. The resource determiners 1232 and 1239 can be configured to determine what resources may be required by a fog node, such as the primary fog node 1204A and the fog nodes 1204B-N, at the edge slice to complete a service request that is received by the primary fog node 1204A. The primary fog node 1204A and/or the fog nodes 1204B-N can then transmit the resource determination(s) to the edge controller 1200, which the edge controller 1200 can use to determine whether the service request can be executed at the edge slice or the cloud slice. The task execution modules 1234 and 1240 can be configured to execute a service request that is referred to either the primary fog node 1204A or the fog nodes 1204B-N by the edge controller 1200. The processor(s) 1236 and 1242 can be configured to provide for the primary fog node 1204A and the fog nodes 1204B-N to perform and execute one or more of the operations described herein. The communication interfaces 1222, 1230, 1238, and 1244 can be configured to provide communication between one or more of the components described herein.

Figure 13:
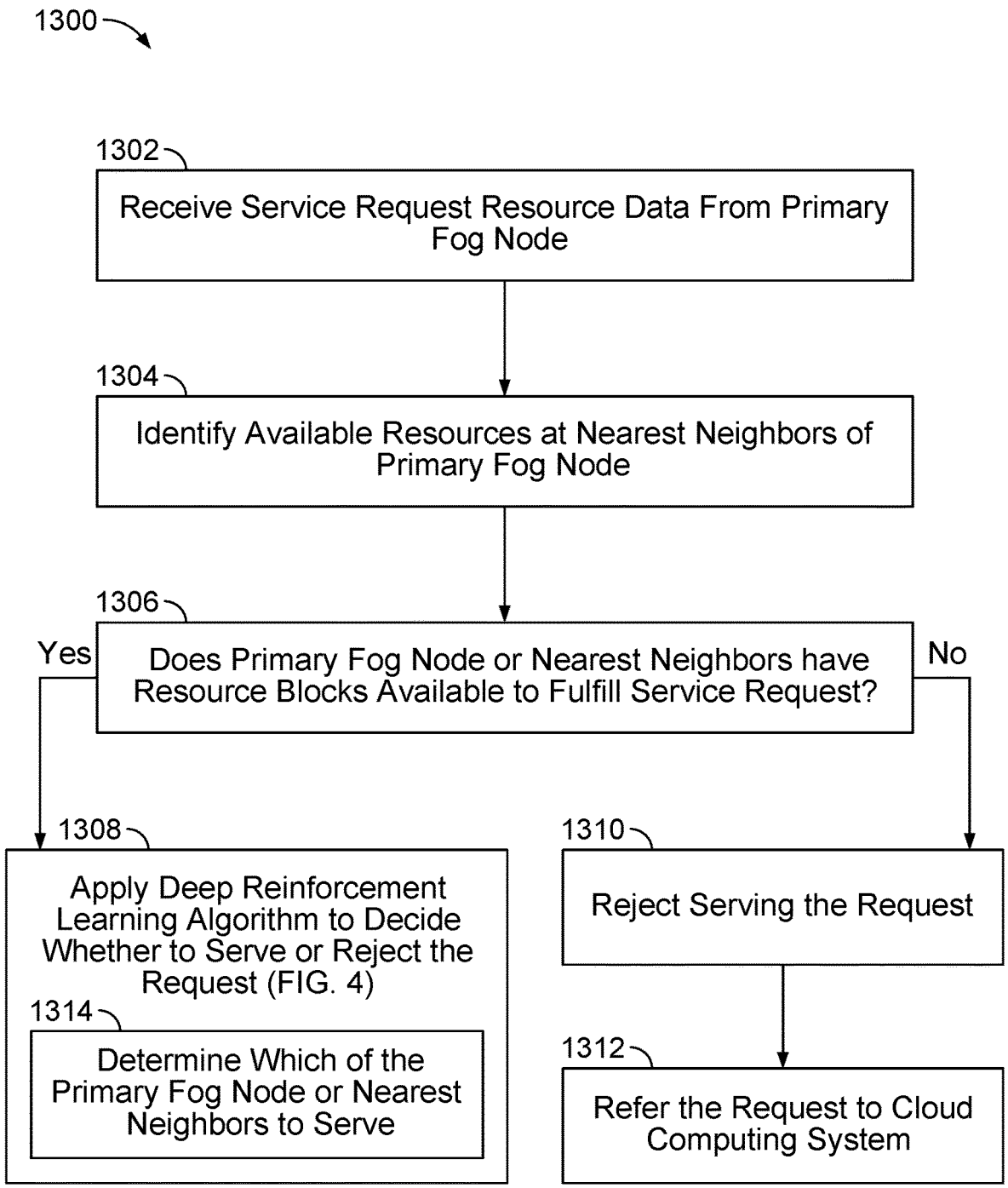
FIG. 13 is a flowchart of a process for implementing the disclosed technology.

FIG. 13 is a flowchart of a process 1300 for implementing the disclosed technology. The process 1300 can be performed by an edge controller as described throughout this disclosure (e.g., refer to the edge controller 1200 in FIG. 12).

Referring to the process 1300, the edge controller can receive service request resource data from a primary fog node in the cluster of fog nodes (1302). As described herein, any one of the fog nodes in the cluster can be designated as the primary fog node (e.g., refer to FIG. 12). The primary fog node dynamically changes based on which of the fog nodes in the cluster receives the service request. Thus, the fog node that receives the service request is designated as the primary fog node. The primary fog node can receive a service request in an edge cluster at a time t with utility. The primary fog node can also compute a number of resource blocks and hold time required to serve a task of the service request locally at the edge cluster of nodes. The primary fog node can then transmit to the edge controller the time t with utility, a resource block number, and the holding time.

The edge controller can then identify available resources at nearest neighbor fog nodes of the primary fog node in 1304. For example, the edge controller can receive resource information from each of the nearest neighbors of the primary fog node. The edge controller can then determine whether the primary node or the nearest neighbors have resource blocks that are available to fulfill the service request (1306). If there are, then a deep reinforcement learning (DRL) algorithm can be applied to decide whether to serve or reject the service request (e.g., refer to FIG. 4) in 1308 at the cluster of fog nodes and by one of the primary fog node or the nearest neighbors. Moreover, for serve actions, the edge controller can determine which of the primary fog node or the nearest neighbors to serve (1314), as depicted and described in reference to FIG. 2 and FIG. 3 (e.g., for k fog nodes in a cluster, a set of actions can include k+1 decisions).

In some implementations, the edge controller can determine whether to serve or reject the service request based on expected rewards. For example, using the DRL algorithm, the edge controller can determine expected future rewards for each serve and reject action. Thus, although resources may be available, the edge controller can reject a service request if the edge controller determines that keeping the available resources for future, potentially higher priority, requests can be more rewarding. In some implementations, the edge controller can serve the service request based on determining that (i) resources are available and (ii) an expected reward for serving the service request exceeds expected future rewards for serving other potential service requests. The edge controller can also reject the service request based on determining that (i) resources are unavailable or (ii) resources are available but the expected reward for serving the service request does not exceed expected future rewards for serving other potential service requests.

If there are no resource blocks available to fulfill the service request at the edge slice in 1306, then the edge controller can reject serving the service request in 1310. The edge controller can then refer the service request to the cloud computing system in 1312. As a result, the cloud computing system can complete the service request in the cloud slice.

FIG. 14 is a schematic diagram that shows an example of a computing device 1400 and a mobile computing device. The computing device 1400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1400 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and can be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as a display 1416 coupled to the high-speed interface 1408. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1404 stores information within the computing device 1400. In some implementations, the memory 1404 is a volatile memory unit or units. In some implementations, the memory 1404 is a non-volatile memory unit or units. The memory 1404 can also be another form of computer-readable medium, such as a magnetic or optical disk.

The storage device 1406 is capable of providing mass storage for the computing device 1400. In some implementations, the storage device 1406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1404, the storage device 1406, or memory on the processor 1402.

The high-speed interface 1408 manages bandwidth-intensive operations for the computing device 1400, while the low-speed interface 1412 manages lower bandwidth-intensive operations. Such allocation of functions is exemplary only. In some implementations, the high-speed interface 1408 is coupled to the memory 1404, the display 1416 (e.g., through a graphics processor or accelerator), and to the high-speed expansion ports 1410, which can accept various expansion cards (not shown). In the implementation, the low-speed interface 1412 is coupled to the storage device 1406 and the low-speed expansion port 1414. The low-speed expansion port 1414, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1400 can be implemented in a number of different forms, as shown in the figure. For example, it can be implemented as a standard server 1420, or multiple times in a group of such servers. In addition, it can be implemented in a personal computer such as a laptop computer 1422. It can also be implemented as part of a rack server system 1424. Alternatively, components from the computing device 1400 can be combined with other components in a mobile device (not shown), such as a mobile computing device 1450. Each of such devices can contain one or more of the computing device 1400 and the mobile computing device 1450, and an entire system can be made up of multiple computing devices communicating with each other.

The mobile computing device 1450 includes a processor 1452, a memory 1464, an input/output device such as a display 1454, a communication interface 1466, and a transceiver 1468, among other components. The mobile computing device 1450 can also be provided with a storage device, such as a micro-drive or other device, to provide additional storage. Each of the processor 1452, the memory 1464, the display 1454, the communication interface 1466, and the transceiver 1468, are interconnected using various buses, and several of the components can be mounted on a common motherboard or in other manners as appropriate.

The processor 1452 can execute instructions within the mobile computing device 1450, including instructions stored in the memory 1464. The processor 1452 can be implemented as a chipset of chips that include separate and multiple analog and digital processors. The processor 1452 can provide, for example, for coordination of the other components of the mobile computing device 1450, such as control of user interfaces, applications run by the mobile computing device 1450, and wireless communication by the mobile computing device 1450.

The processor 1452 can communicate with a user through a control interface 1458 and a display interface 1456 coupled to the display 1454. The display 1454 can be, for example, a TFT (Thin-Film-Transistor Liquid Crystal Display) display or an OLED (Organic Light Emitting Diode) display, or other appropriate display technology. The display interface 1456 can comprise appropriate circuitry for driving the display 1454 to present graphical and other information to a user. The control interface 1458 can receive commands from a user and convert them for submission to the processor 1452. In addition, an external interface 1462 can provide communication with the processor 1452, so as to enable near area communication of the mobile computing device 1450 with other devices. The external interface 1462 can provide, for example, for wired communication in some implementations, or for wireless communication in other implementations, and multiple interfaces can also be used.

The memory 1464 stores information within the mobile computing device 1450. The memory 1464 can be implemented as one or more of a computer-readable medium or media, a volatile memory unit or units, or a non-volatile memory unit or units. An expansion memory 1474 can also be provided and connected to the mobile computing device 1450 through an expansion interface 1472, which can include, for example, a SIMM (Single In Line Memory Module) card interface. The expansion memory 1474 can provide extra storage space for the mobile computing device 1450, or can also store applications or other information for the mobile computing device 1450. Specifically, the expansion memory 1474 can include instructions to carry out or supplement the processes described above, and can include secure information also. Thus, for example, the expansion memory 1474 can be provided as a security module for the mobile computing device 1450, and can be programmed with instructions that permit secure use of the mobile computing device 1450. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1464, the expansion memory 1474, or memory on the processor 1452. In some implementations, the computer program product can be received in a propagated signal, for example, over the transceiver 1468 or the external interface 1462.

The mobile computing device 1450 can communicate wirelessly through the communication interface 1466, which can include digital signal processing circuitry where necessary. The communication interface 1466 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1468 using a radio-frequency. In addition, short-range communication can occur, such as using a Bluetooth, WiFi, or other such transceiver (not shown). In addition, a GPS (Global Positioning System) receiver module 1470 can provide additional navigation- and location-related wireless data to the mobile computing device 1450, which can be used as appropriate by applications running on the mobile computing device 1450.

The mobile computing device 1450 can also communicate audibly using an audio codec 1460, which can receive spoken information from a user and convert it to usable digital information. The audio codec 1460 can likewise generate audible sound for a user, such as through a speaker, e.g., in a handset of the mobile computing device 1450. Such sound can include sound from voice telephone calls, can include recorded sound (e.g., voice messages, music files, etc.) and can also include sound generated by applications operating on the mobile computing device 1450.

The mobile computing device 1450 can be implemented in a number of different forms, as shown in the figure. For example, it can be implemented as a cellular telephone 1480. It can also be implemented as part of a smart-phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for processing a service request within a network environment, the method comprising:
    receiving, by an edge controller from a primary fog node in a first cluster of fog nodes, a service request resource data for a service request, wherein the first cluster of fog nodes is configured to execute service tasks received from the network environment, the first cluster of fog nodes further including nearest neighbor fog nodes of the primary fog node;
    identifying, by the edge controller and based on the service request resource data, available resources at the nearest neighbor fog nodes and the primary fog node;
    determining, by the edge controller, whether the nearest neighbor fog nodes or the primary fog node have resource blocks available to fulfill the service request;
    identifying, by the edge controller and using a DRL algorithm, that the service request can be fulfilled in response to determining that (i) the nearest neighbor fog nodes or the primary fog node have the resource blocks available to fulfill the service request and (ii) expected future reward for saving the resource blocks available to fulfill the service request for future service requests is less than an expected reward associated with serving the service request at another of the nearest neighbor fog nodes or the primary fog node; and
    serving, by the edge controller, the service request at one of the nearest neighbor fog nodes or the primary fog node based on determining that (i) the one of the nearest neighbor fog nodes or the primary fog node has the resource blocks available to fulfill the service request and (ii) the expected future reward for saving the resource blocks available is less than the expected reward associated with serving the service request at the another of the nearest neighbor fog nodes or the primary fog node.

2. The method of claim 1, wherein:
    the service request is received, by the primary fog node and from the network environment, the service request including a timestamp and a utility, and
    the service request resource data includes the timestamp, a quantity of resource blocks required to serve the service request, and a hold time required to serve the service request locally by any one of the nearest neighbor fog nodes or the primary fog node.

3. The method of claim 1, wherein the edge controller is the primary fog node or one of the nearest neighbor fog nodes in the first cluster of fog nodes.

4. The method of claim 1, wherein the edge controller is centrally located in a geographic area of the first cluster of fog nodes.

5. The method of claim 1, further comprising learning, by the edge controller and using the DRL algorithm, how to (i) allocate limited resources in the first cluster of fog nodes for each service request and (ii) maximize grade-of-service (GoS), wherein the GoS is a proportion of a quantity of served high-load service requests to a total number of high-load service requests in the first cluster of fog nodes.

6. The method of claim 1, further comprising assigning, by the edge controller, a reward for serving the service request.

7. The method of claim 1, further comprising serving, by the edge controller, the service request based on determining that the expected reward associated with serving the service request exceeds a threshold value.

8. A system for processing a service request within a network environment, the system comprising:
    a first cluster of fog nodes configured to execute one or more service tasks that are received from the network environment, wherein the first cluster of fog nodes includes a primary fog node and nearest neighbor fog nodes of the primary fog node, the primary fog node configured to:
        receive, from the network environment, a service request, wherein the service request includes a first time and a utility;
        determine, based on the service request, service request resource data, wherein the service request resource data includes the first time, a quantity of resource blocks required to serve the service request, and a hold time required to serve the service request locally by any one of the nearest neighbor fog nodes or the primary fog node;

an edge controller communicatively connected to the network environment and the first cluster of fog nodes, the edge controller configured to:

receive, from the primary fog node, the service request resource data;

identify, based on the service request resource data, available resources at the nearest neighbor fog nodes and the primary fog node;

determine whether the nearest neighbor fog nodes or the primary fog node have resource blocks available to fulfill the service request;

identify, using a deep reinforcement learning (DRL) algorithm, that the service request can be fulfilled in response to determining that (i) the nearest neighbor fog nodes or the primary fog node have the resource blocks available to fulfill the service request and (ii) expected future reward for saving the resource blocks available to fulfill the service request for future service requests is less than an expected reward associated with serving the service request at another of the nearest neighbor fog nodes or the primary fog node; and serve the service request at one of the nearest neighbor fog nodes or the primary fog node based on determining that (i) the one of the nearest neighbor fog nodes or the primary fog node has the resource blocks available to fulfill the service request and (ii) the expected future reward for saving the resource blocks available is less than the expected reward associated with serving the service request at the another of the nearest neighbor fog nodes or the primary fog node.

9. The system of claim 8, wherein the edge controller is the primary fog node or one of the nearest neighbor fog nodes in the first cluster of fog nodes.

10. The system of claim 8, wherein the edge controller is centrally located in a geographic area of the first cluster of fog nodes.

11. The system of claim 8, wherein the primary fog node and the nearest neighbor fog nodes in the first cluster of fog nodes are communicatively connected via optical links.

12. The system of claim 8, wherein the edge controller is further configured to assign a reward for serving the service request.

13. The system of claim 8, wherein the edge controller is trained to allocate limited resources in the first cluster of fog nodes using a Deep Q-Network (DQN).

14. The system of claim 8, wherein the service request includes at least one of (i) providing smart lighting and automating public buildings, (ii) managing air quality and monitoring noise, (iii) determining and providing smart waste management and energy consumption management, (iv) providing smart parking assistance, (v) providing in-vehicle audio and video infotainment, (vi) executing a driver authentication service, (vii) monitoring structural health of buildings, (viii) managing and providing safe share rides, (ix) executing a smart amber alerting system, (x) executing a driver distraction alerting system, and (xi) monitoring autonomous driving, wherein the service request is associated with a geographic area of the network environment.

15. The system of claim 8, wherein the service request includes one or more of adjusting smart lighting and automating public buildings in a geographic area associated with the network environment, adjusting air quality and monitoring noise in a geographic area associated with the network environment, making determinations about smart waste management and energy consumption management in a geographic area associated with the network environment, smart parking assistance in a geographic area associated with the network environment, audio and video infotainment in vehicles in a geographic area associated with the network environment, authenticating drivers in a geographic area associated with the network environment, monitoring structural health of buildings in a geographic area associated with the network environment, determining and providing safe share rides in a geographic area associated with the network environment, and executing a smart amber alerting system in a geographic area associated with the network environment.

16. The system of claim 8, wherein the service request includes execution of driver distraction alerting systems in a geographic area associated with the network environment.

17. The system of claim 8, wherein the service request includes providing and managing autonomous driving in a geographic area associated with the network environment.

* * * * *